United States Patent
Tuchman et al.

(10) Patent No.: US 10,558,719 B2
(45) Date of Patent: Feb. 11, 2020

(54) APPARATUSES, METHODS AND SYSTEMS FOR INSIGHT DISCOVERY AND PRESENTATION FROM STRUCTURED AND UNSTRUCTURED DATA

(71) Applicant: Quantifind, Inc., Menlo Park, CA (US)

(72) Inventors: Ari Tuchman, Palo Alto, CA (US); John Stockton, Redwood City, CA (US); Lance Rutter, Redwood City, CA (US); Aakash Sabharwal, Mountain View, CA (US); Karthik Thiyagarajan, Palo Alto, CA (US); Ryan LeCompte, Milpitas, CA (US); Andrew Steele, Seattle, WA (US)

(73) Assignee: Quantifind, Inc., Menlo Park, CA (US)

( * ) Notice: Subject to any disclaimer, the term of this patent is extended or adjusted under 35 U.S.C. 154(b) by 649 days.

(21) Appl. No.: 14/964,404

(22) Filed: Dec. 9, 2015

(65) Prior Publication Data

US 2016/0162588 A1    Jun. 9, 2016

Related U.S. Application Data

(63) Continuation-in-part of application No. 14/929,246, filed on Oct. 30, 2015.

(60) Provisional application No. 62/089,232, filed on Dec. 9, 2014, provisional application No. 62/134,470, filed on Mar. 17, 2015, provisional application No. 62/072,923, filed on Oct. 30, 2014.

(51) Int. Cl.
*G06F 16/9535*    (2019.01)
*G06F 16/33*    (2019.01)

(52) U.S. Cl.
CPC ...... *G06F 16/9535* (2019.01); *G06F 16/3344* (2019.01)

(58) Field of Classification Search
None
See application file for complete search history.

(56) References Cited

U.S. PATENT DOCUMENTS

| | | | |
|---|---|---|---|
| 2011/0238647 A1* | 9/2011 | Ingram | G08G 1/20 707/706 |
| 2013/0297705 A1* | 11/2013 | Arora | G06Q 50/01 709/205 |
| 2014/0052540 A1* | 2/2014 | Rajaram | G06Q 30/0255 705/14.66 |
| 2014/0181141 A1 | 6/2014 | Sowell et al. | |
| 2014/0280312 A1* | 9/2014 | Blumenfeld | G06F 17/30442 707/769 |

(Continued)

*Primary Examiner* — Thu N Nguyen
(74) *Attorney, Agent, or Firm* — Irell & Manella LLP

(57) ABSTRACT

The APPARATUSES, METHODS AND SYSTEMS FOR INSIGHT DISCOVERY AND PRESENTATION FROM STRUCTURED AND UNSTRUCTURED DATA ("IDAP") provides a platform that, in various embodiments, is configurable to identify, display, and act upon insights derived from large volumes of data. In one embodiment, the IDAP is configurable to determine values and relationships for primal data. Identified relationships may be leveraged to build queries optimized for efficient data access across data volumes. The IDAP may also be configured to identify drivers of global metrics of interest, leverage those drivers to discern the efficacy of media and/or advertising campaigns, and provide recommendations to improve and/or optimize campaign efficacy.

19 Claims, 27 Drawing Sheets

(56) References Cited

U.S. PATENT DOCUMENTS

| | | | |
|---|---|---|---|
| 2015/0180250 A1* | 6/2015 | Fink | H01M 10/441 320/135 |
| 2016/0063566 A1* | 3/2016 | Nagarathinam | G06Q 30/0269 705/14.45 |
| 2016/0073166 A1* | 3/2016 | Hu | H04N 5/765 725/20 |

* cited by examiner

| 201 | 205 | 210 | 215 | 220 | 225 | 230 | 235 |
|---|---|---|---|---|---|---|---|
| Header | User ID | Timestamp | Num Text Bytes | Text Bytes | Num Terms | Terms | ... |
| 2 bytes | 8 bytes | 8 bytes | 2 bytes | Num Text Bytes * 1 byte | 2 bytes | Num Terms * 8 bytes | ... |

| 1101 | 1105 | 1110 | 1115 | 1120 | 1125 | 1130 | 1135 | 1140 |
|---|---|---|---|---|---|---|---|---|
| T:D= | T is important for D driving Brand KPI relative to the overall audience | • Network is important for Hispanics driving Phone Brand 1 Support relative to the overall audience<br>• Mold is neutral for females 25+ driving Soda Brand 3 Sales relative to the overall audience<br>• Appearance is a weakness for males 25+ in the south driving Diet Soda churn relative to the overall audience | Computed over baseline periods | (T & I & D)/(I & D) → (T & I)/I = DP | Strength of T in D= | important, weak, neutral | Bars for strengths constrained to D= | as the anchor brand, "NOT" Brand Specific topics= |
| T:D=<br>C= | T is important for D driving Brand KPI relative to C= | • Appearance is important for females 25+ driving Diet Soda Churn relative to Soda Brand 2=<br>• Coverage is weak for hispanics driving Phone Brand 2 Support relative to Phone Brand 1=<br>• Customer Service – Next Sales= | Computed over baseline periods | (T & I & D & Brand)/(I & D & Brand)/(I & D)/(I & C & D)/(I & C & D) = DP | Strength of T in D= for Brand and C= | important, weaker, neutral | Bars for Topics constrained to D= for Brand and C= | "NOT" Brand Specific topics= |
| T:D=↑<br> | T increased in importance for D driving Brand KPI= | • Taste remained neutral in importance for females 25+ driving Soda Brand 2= – Next Sales=<br>• Customer Service decreased in importance for hispanics driving Phone Brand 1 Support= in Phone Brand 1= | Computed current t over last t= | (T & I & D & t1) – (T & I & D & t1–1)/(I & D & t1) > thresholds | % Change in Strength of T for D in Brands= | increased, decreased, neutral | Time Series for all topics in Brand OR Bars for topics with change values for Topics in Brands= |  |
| T:D=↑<br>C= | T increased in importance for D driving Brand KPI= | • Taste remained neutral in importance for females 25+ driving Soda Brand 1= – Next Sales= relative to Regular Soda Brand 1= | Computed current t over last t= | Delta_1(T & I & D & Brand) = Delta_1(T & I & D & Brand)/(I & D & Brand) > 1/(T & D & t1) | % Change in Strength of T for D in Brand and C= | increased, decreased, neutral | Time Series for all topics in Brand, C OR Bars for topics with change | In our implementation don't show this statement of the Intent Function |

FIGURE 11B

| | 11.01 | 11.05 | 11.10 | 11.15 | 11.20 | 11.25 | 11.30 | 11.35 | 11.40 |
|---|---|---|---|---|---|---|---|---|---|
| | | relative to C₁ also.* | * Customer Service decreased in importance for Hispanics, driving Phone Brand 1 Support relative to Phone Brand 3* | | & O) / (1 & D&O)* | | | values for Topic in Brand, C* | remained steady for that Brand but went down for C. In that case, make a statement with C as the anchor brand. *NOT Brand Specific topic.* |
| T.I= | | T is important compared to D₁ for customers driving Brand KPI* | * Mobile Share Value is important compared to Fire Phone for customers driving Phone Brand 1 Support* * Meld is a neutral compared to Nutrition for customers driving Soda Brand 3 States* * Aspartame is weak compared to Ace-K for customers driving Diet Soda Brand 1 Churn* | Compared over baseline periods | (T & I) / (1 × (T & I) – 1, where I, D, are Brand Specific Topics* | Strength of T and I* | important, weak, neutral* | Bars for Brand Specific topics* | In one implementation, Brand Specific Topics ONLY. In one implementation, a reference baseline is used to compare with. In this case, another topic that is not a brand specific topic may be added as a reference. The (T,D) pairs may, in one implementation, be configurable at Topic creation edit time.* |
| D = | | D driving Brand KPI increased its importance* | * Hispanics driving Phone Brand 1 Support increased in importance* * females 25+ in the NE driving Diet Soda Churn increased in importance* | Compared current over last* | (D & 1 & O) / (1 & D & 1 & O) – (D & 1 & O) / (1 & O) – 2* | % Change in Strength of D (Demo Fraction) over time* | increased, decreased, neutral* | Time Series for Demo Fraction of all comparable demos in Brands* | * |
| D, C= | | D, driving KPI, are important to* | * Hispanics driving Brand Support are important to Phone Brand 1 relative to | Compared over baseline* | (D & 1 & Brand) / (1 & Brand) = (D & 1 )* | Strength of D (Demo Fraction)* | important, neutral, under-* | Bars for Strength (*Demo Fraction*) of all | * |

FIGURE 11C

| 1101 | 1105 | 1110 | 1115 | 1120 | 1125 | 1130 | 1135 | 1140 |
|---|---|---|---|---|---|---|---|---|
| D-C-p | Brand relative to Phone Brand 2s | Phone Brand 2s • females 25+ in the NE-churn are important to Diet Soda Brand 1 relative to Soda Brand 2s | periods | & C-p/(1 & C-p) | for Brand and C-p | represented | demos in brands | |
| | D driving KPI increased in importance for Brand relative to Phone Brand 2s | • Hispanics driving Brand 1 Support increased in importance for Phone Brand 1 relative to Phone Brand 2s | Computed current s over later s | (D & 1 & C-p t1)/(1 & C-p t1) – (D & 1 & Q & C-p)/(1 & Q & C-p) | % Change in Strength of D (Demo Fraction) over time t for Brand and C-p | increased, decreased, neutral s | Time Series for Demo Fraction of all comparable demos in Brand, C-p | n |
| | Audience for Brand KPI has increased relative to C-p over s | • females 25+ in the NE driving Diet Soda churn increased in importance for Diet Soda relative to Mid-Cal Soda • Audience for Diet Soda Churn has decreased year over years | Computed over s | Intent Score = Predicted KPI + Constant (Intent_Score_1) – (Intent_Score_1 – threshold)s | % Change in Intent Score Predicted KPI (over time) for Brands | increased, decreased, neutral s | Time Series for Intent Score / Predicted KPI for Brand, C-p | n |

FIGURE 11D

Share Insight

File Format
Letter-sized (8.5 x 11") or
presentation (16:9 ratio) file suitable
for PowerPoint and Keynote.

○ Letter
○ Presentation     12 65

Type
○ PDF     12 67
○ JPG

Cover Page

Glossary      12 69

Report Configuration

Cancel    Download    [       ]     12 71

Share Insight

Email Address

Subject: AUTO POPULATED WITH INSIGHT     12 72

Message (optional)

Attachment: Quantifind.filename.zip

Cancel    Back

APPARATUSES, METHODS AND SYSTEMS FOR INSIGHT DISCOVERY AND PRESENTATION FROM STRUCTURED AND UNSTRUCTURED DATA

PRIORITY CLAIM

This application is a non-provisional of, and claims priority under 35 U.S.C. § 119, to prior U.S. provisional patent application Ser. No. 62/089,232 entitled, "APPARATUSES, METHODS AND SYSTEMS FOR INSIGHT DISCOVERY AND PRESENTATION FROM STRUCTURED AND UNSTRUCTURED DATA," filed Dec. 9, 2014, and prior U.S. provisional patent application Ser. No. 62/134,470 entitled, "APPARATUSES, METHODS AND SYSTEMS FOR INSIGHT DISCOVERY AND PRESENTATION FROM STRUCTURED AND UNSTRUCTURED DATA," filed Mar. 17, 2015.

This application is also a continuation-in-part, and claims priority under 35 U.S.C. § 120, to prior U.S. non-provisional patent application Ser. No. 14/929,246 entitled, "APPARATUSES, METHODS AND SYSTEMS FOR EFFICIENT AD-HOC QUERYING OF DISTRIBUTED DATA," filed Oct. 30, 2015, which in turn is a non-provisional of, and claims priority under 35 U.S.C. § 119, to prior U.S. provisional patent application Ser. No. 62/072,923 entitled, "APPARATUSES, METHODS AND SYSTEMS FOR EFFICIENT AD-HOC QUERYING OF DISTRIBUTED DATA," filed Oct. 30, 2014.

All of the aforementioned applications are expressly incorporated in their entirety herein by reference.

FIELD

The present innovations generally address efficient data collection, storage, and evaluation, and more particularly, include APPARATUSES, METHODS AND SYSTEMS FOR INSIGHT DISCOVERY AND PRESENTATION FROM STRUCTURED AND UNSTRUCTURED DATA.

BACKGROUND

The advent of the internet and mobile device technologies have brought about a sea change in the distribution and availability of information. Ubiquitous electronic communications have resulted in large volumes of information being generated and, often, made widely available.

BRIEF DESCRIPTION OF THE DRAWINGS

The accompanying appendices and/or drawings illustrate various non-limiting, example, innovative aspects in accordance with the present descriptions:

FIG. 2A shows an implementation of data structure for compacted data in one embodiment;

Figure 11A:
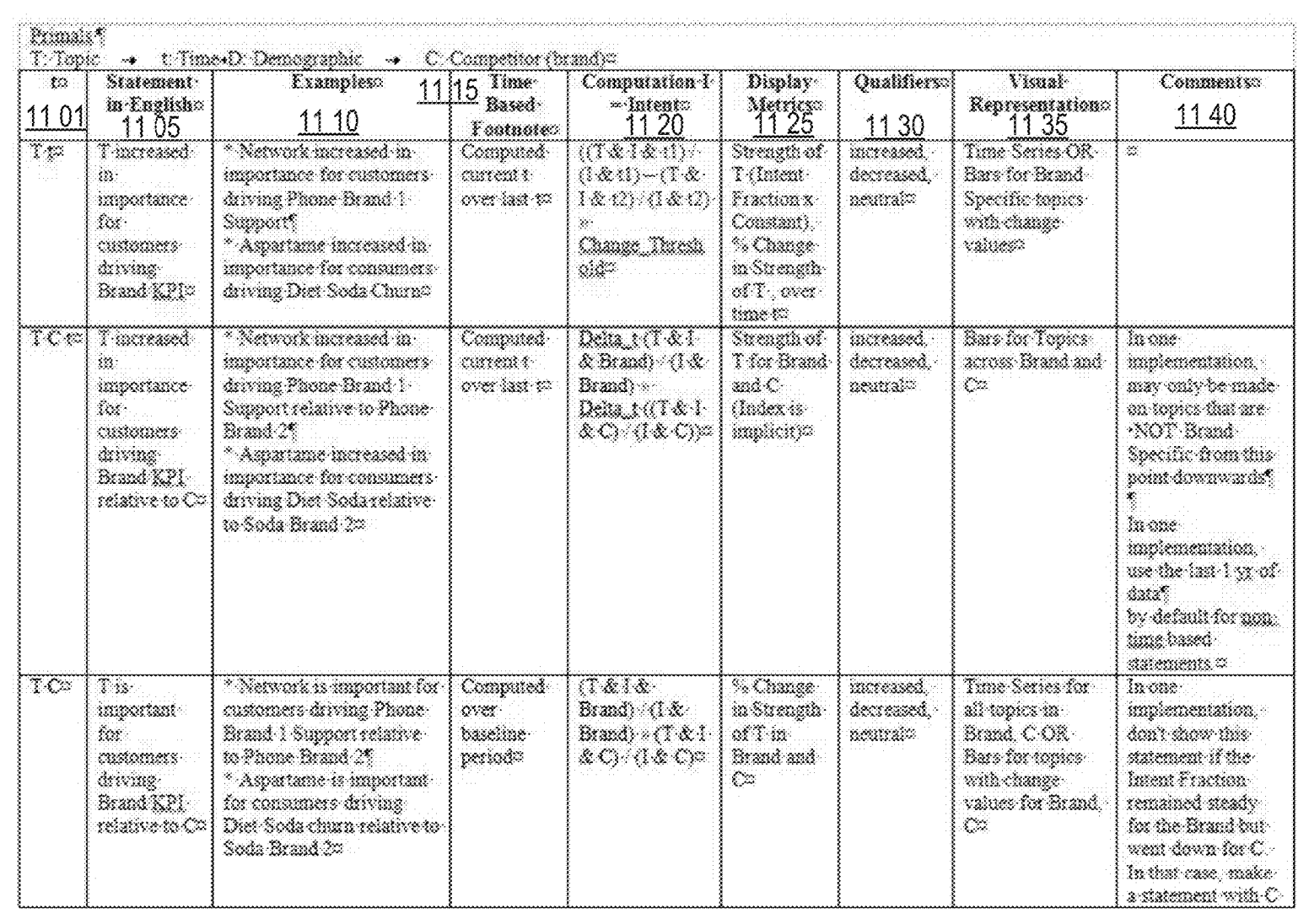

FIGS. 11A-11D show a table of primals and related insights in one embodiment;

Figure 1:
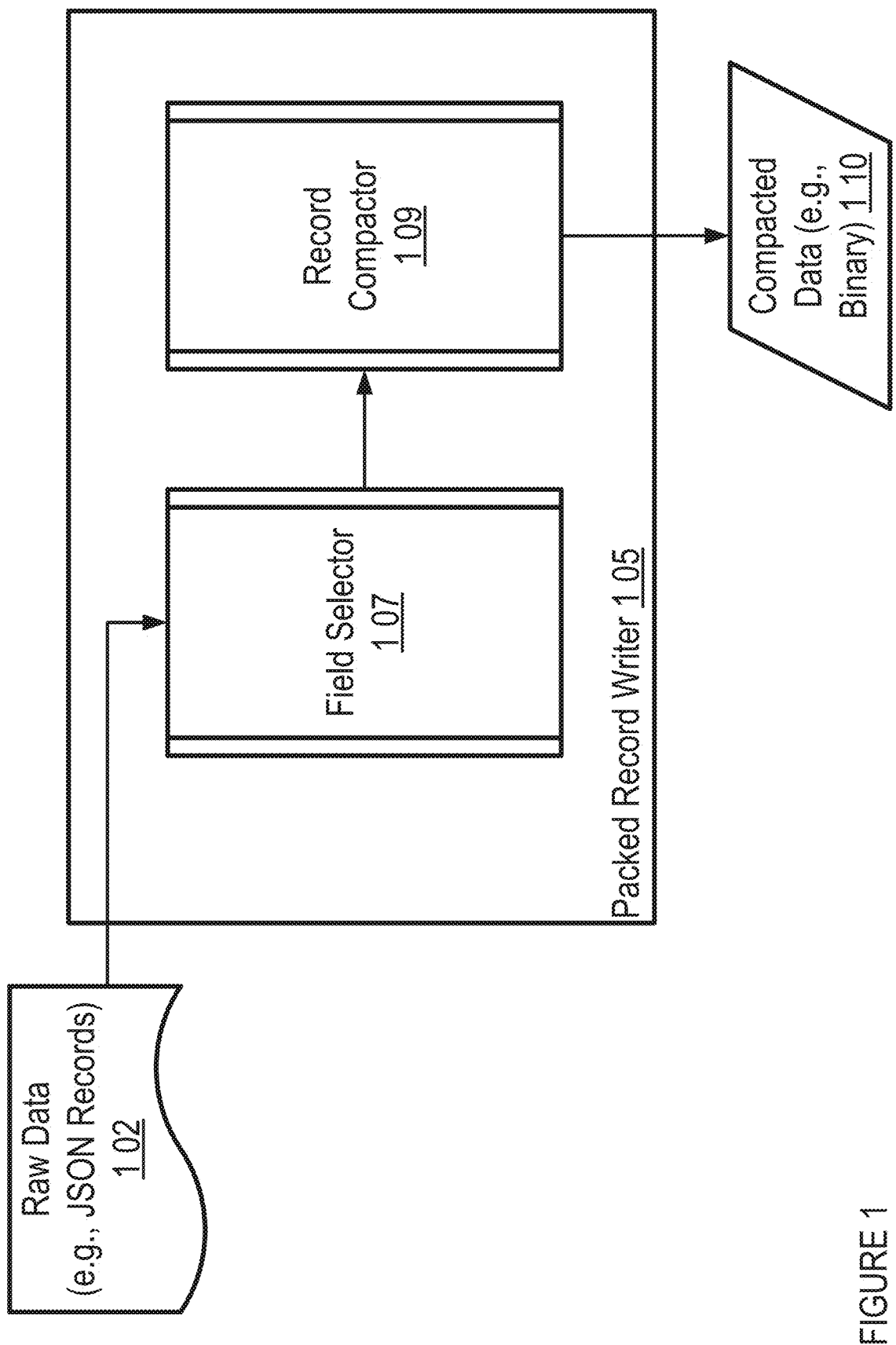
FIG. 1 shows an implementation of data flow for data compacting in one embodiment of IDAP operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

IDAP

The APPARATUSES, METHODS AND SYSTEMS FOR INSIGHT DISCOVERY AND PRESENTATION FROM STRUCTURED AND UNSTRUCTURED DATA ("IDAP") provide a platform that, in various embodiments, is configurable to identify, display, and act upon insights derived from large volumes of data. In one embodiment, the IDAP is configurable to determine values and relationships for primal data, which is used to construct natural language insights. Insight records may be automatically filtered and/or sorted according to various selectable criteria. In some embodiments, insight records may be employed to generate natural language reports, generate action-item reports, and/or implement recommended actions such as advertisement purchases. In various embodiments, the IDAP may be configurable as a topic builder, permitting users to discovery topics, tags, labels, and/or the like to assign to documents in a corpus and/or to facilitate highly optimized queries over volumes of data. In other embodiments, the IDAP may be configurable for influence discovery across social media and/or other structured and/or unstructured document sources. For example, the IDAP may be configured to identify subsets of social media users responsible for driving one or more global metrics (e.g., sales, subscriptions, and/or the like) from unstructured data, e.g., without requiring exemplars, templates, and/or the like for such users in advance. In other embodiments, the IDAP may be configurable to evaluate efficacy and/or return on investment of advertising and/or other media campaigns and/or to recommend actions for improvement thereof.

In one embodiment, IDAP includes a distributed, in-memory, real-time computing platform that supports fast ad-hoc querying against large volumes of data. In one implementation, this comprises an in-memory combination of map/reduce and faceted search. IDAP may be used, in one implementation, for fast slicing and dicing of, for example, social data (e.g., social network post and/or feed data), terms derived therefrom, and/or the like. In one implementation, IDAP apparatuses, methods and systems may include the following:

convert the data into a compact, tightly packed byte structure according to one or more customized schema/protocol (in one implementation, this reduces the size of the original JSON social joins by up to 72%);

distribute slices (e.g., by an IDAP master server) of the compacted data among multiple nodes (e.g., IDAP workers) in the cluster;

perform custom, on-the-fly map/reduce type operations over the compact data in-memory across all nodes;

in one implementation, execution of queries lazily unpacks only the portions of the compact records that are useful for a particular type of query;

in one implementation, the system may cache "facet offsets" into the compact records to improve performance of queries that refer to a particular facet.

In one implementation, a Java Virtual Machine application toolkit such as Akka Cluster may be utilized for distributed communication between the master/worker nodes in the cluster.

In one embodiment, IDAP supports operations over the social data such as, but not limited to:
 counts
 time series
 sample
 top K over entities/favs
 statistical "slice" compare
 Querying In one implementation, a check may be performed as to whether the cluster is up, operational, and/or the like. This may be achieved, for example, with a status call similar to the following example:
curl http://IDAP:3000/status In this example, curl is a Linux command for making HTTP requests on the command-line of a system running a Linux-based operating system. In other implementations, a user could make the HTTP request by, for example, entering a corresponding uniform resource locator (URL) into a web browser. In some embodiments, any tool that can make HTTP requests may be used as a client interface for RTC operation, including submitting queries and receiving responses.

In one implementation, the status call may also yield a list of all verticals loaded in IDAP.

In one implementation, a time series over the entire vertical (e.g., counts de-duped by user/day) may be requested, such as via a command similar to the following example:
curl http://IDAP:3000/timeseries?targetVertical=haircare In one implementation, appending "target" to the name of a particular field (e.g., from "Vertical" to "targetVertical") may signify narrowing of the search query to a particular element, value, and/or the like for that field.

In one implementation, total counts over the entire vertical during a particular date and/or date range (counts de-duped by user over given time range, or over entire vertical if no time range specified) may be requested, such as via a command similar to the following example:
curl http://IDAP:3000/counts?targetVertical=haircare&targetStartDate In one implementation, a time series over the entire vertical for people talking about, for example, "hair" may be requested, such as via a command similar to the following example:
curl "http://IDAP:3000/timeseries?targetVertical=haircare&targetTopic=.*hair.*"

In one implementation, a sample of haircare tweets for, e.g., Shampoo Brand 1 may be requested (more results may be obtained, e.g., by specifying a higher value via the sampleSize parameter), such as via a command similar to the following example:
curl "http://IDAP:3000/sample?targetVertical=haircare&targetQpids=Shampoo Brand 1:22a42"

In one implementation, ranked entities for Shampoo Brand 1 tweets talking about "hair" (more results may be obtained, e.g., by specifying a higher value via the numResults parameter) may be requested, such as via a command similar to the following example:
curl "http://IDAP:3000/compare?targetVertical=haircare&targetEntities=shine&targetQpids= Shampoo-Brand 1:

In one implementation, the top 50 raw entity counts for the haircare vertical and shampoo topic (more results may be obtained, e.g., by specifying a higher value via the numResults parameter) may be requested, such as via a command similar to the following example:
curl "http://IDAP:3000/entityCounts?targetVertical=haircare&targetEntities=shampoo"

In one implementation, the date entity matrix for the carrier vertical for the top K global entities K may be changed, e.g., with the numResults parameter; in one implementation, this defaults to 5000) may be requested. In one implementation, this will return a results zip file containing the date entity matrix in MatrixMarket format.
curl "http://IDAP:3000/entityCounts?targetVertical=carrier&groupBy=date"

In one implementation, the above request may be run for one or more targetQpids, such as according to the following example.
curl "http://IDAP:3000/entityCounts?targetVertical=carrier&targetQpids=att:5a458&groupBy=date"

In one implementation, the top 50 raw fav counts for the haircare vertical and shampoo topic may be requested (you can get more results by specify a higher value via the numResults parameter), such as via a command similar to the following example:
curl "http://IDAP:3000/favCounts?targetVertical=haircare?targetEntities=shampoo"

In one implementation, a request may be made to IDAP for all qpids belonging, for example, to a particular vertical via the qpids call, e.g.:
curl "http://IDAP:3000/qpids?targetVertical=carrier"

In one implementation, qpids may refer to one or more product identifiers and/or product identification codes.

Query Parameters

In one implementation, query params for the target group may include:
targetVertical=haircare
targetTopic=.*shine.*
targetQpids=Shampoo Brand 1:22a42
targetIntentful=true/false
targetExpr=gender:male*age:0to17|18to24*ethnicity: asian//for asian males under 25
targetStartDate=2012-05-01
targetEndDate=2012-06-01
targetState=ca-tx
targetEntities=[(shine,shiny),hair]
targetFavs=abc
 Query params for the reference group:
refVertical=haircare
refTopic=.*shine.*
refQpids=Shampoo Brand 1:22a42
refIntentful=true/false refExpr=gender:male*age:0to17|18to24*ethnicity:asian//
    for asian males under 25
refStartDate=2012-05-01
refEndDate=2012-06-01.
refState=ca-tx
refEntity=bought
refEntities=[(shine, shiny),hair]
refFavs=nbc In one implementation, the query parameters that support multiple values may include:
targetQpids/refQpids (e.g. tmobile:3160a-verizon:e77e9-sprint:05f04)
targetState/refState (e.g. ca, or ca-ga-il for all three states)
targetEntities/refEntities (e.g. (buy,buys,bought))
targetFavs/refFavs (e.g. abc or (abc,nbc,fox))
targetEntities and targetFavs Parameter Format Embodiments
Single entity example (match given entity):
targetEntities=hair
Negation example (does not match given entity, use leading "!" and surround entity in parens):
targetEntities=!(hair)
Or grouping example (matches any one, enclose in "( )"):
targetEntities=(hair, curls)
And grouping example (matches every one, enclose in "[ ]"):
targetEntities=[hair, shine]
Mix and match examples:
targetEntities=[hair,(shine,clean),!(head and shoulders)]
groupBy Parameters (in one implementation, only for entityCounts/)

In one implementation, the date entity matrix for entityCounts query in MatrixMarket format may take a form similar to the following example:
groupBy=date
numResults Parameters In one implementation, the top K global Entities being considered for groupBy query may be limited, e.g.:
numResults=10000

Age Expression Parameter

In one implementation, the targetExpr and refExpr parameters support at least the following age buckets (leave param out entirely from URL for no age filter). Note that, in one implementation, multiple values can be specified using a pipe to separate them in order to create a bucket for the full range, e.g. for "under 25" you would specify targetExpr=age:0to17|18to24. In one implementation, must be prefaced by age: Supported age buckets may include:
0to17
18to24
25to29
30to34
35to39
40to49
50to99

Ethnicity Parameter

In one implementation, the targetExpr and refExpr parameters support at least the following values (leave param out entirely from URL for no ethnicity filter) (In one implementation, must be prefaced by ethnicity):
other
black
white
asian
hispanic Gender Parameter In one implementation, the targetExpr and refExpr parameters support at least the following values (leave param out entirely from URL for no gender filter)(In one implementation, must be prefaced by gender):
male
female US State Parameter In one implementation, the targetState and refState parameters support at least the following values (leave param out entirely from URL for no geo/state filter)—the state abbreviation can be specified in upper or lower case as well:
AL (alabama)
AK (alaska)
AZ (arizona)
AR (arkansas)
CA (california)
CO (colorado)
CT (connecticut)
DE (delaware)
DC (district of columbia)
FL (florida)
GA (georgia)
HI (hawaii)
ID (idaho)
IL (illinois)
IN (indiana)
IA (iowa)
KS (kansas)
KY (kentucky)
LA (louisiana)
ME (maine)
MD (maryland)
MA (massachusetts)
MI (michigan)
MN (minnesota)
MS (mississippi)
MO (missouri)
MT (montana)
NE (nebraska)
NV (nevada)
NH (new hampshire)
NJ (new jersey)
NM (new mexico)
NY (new york)
NC (north carolina)
ND (north dakota)
OH (ohio)
OK (oklahoma)
OR (oregon)
PA (pennsylvania)
RI (rhode island)
SC (south carolina)
SD (south dakota)
TN (tennessee)
TX (texas)
UK (united kingdom)
UT (utah)
VT (vermont)
VA (virginia)
WA (washington)
WV (west virginia)
WI (wisconsin)
WY (wyoming)

Plotting

In one implementation, the /timeseries call supports a format=plot optional parameter that will return a zoomable chart (based on high charts) instead of a JSON time series result.

Example http://IDAP:3000/timeseries?
targetVertical=carrier&targetQpids=att:
5a458&format=plot Multiple Target Expressions in Single Request In one implementation, a time series or total count for multiple demos may be requested in a single call to the service. For example, multiple targetExpr params may be specified for each demo group of interest.

For example:
(JSON)
http://IDAP:3000/timeseries?
targetVertical=hardwarestore&targetQpids=homedepot:
7f878&targetExpr=gender:male&targetExpr=gender:
female&targetExpr=(buy,buys,buying,bought)
&format=json
http://IDAP:3000/counts?
targetVertical=hardwarestore&targetQpids=homedepot:
7f878&targetExpr=gender:male&targetExpr=gender:
female&targetExpr=(buy,buys,buying,bought)
&format=json
(Plots)
http://IDAP:3000/timeseries?
targetVertical=hardwarestore&targetQpids=homedepot:
7f878&targetExpr=gender:
male&targetExpr=genderfemale&targetExpr=(buy,buys,
buying,bought)&format=plot Request Batching In one implementation, IDAP supports at least request batching for /counts requests. Taking advantage of request batching can greatly improve the performance of a query depending on the use case. For example, in performing multiple /counts calls, one may batch them all together in a single HTTP request by taking advantage of "indexed" parameters. Each unique request may be prefixed with a unique numeric identifier prefix, e.g. [0], [1], [2], etc. Here's an example of a single batched IDAP request that contains 2 indexed queries:

http://IDAP:3000/counts?[0]targetVertical=restaurant&
[0]targetQpids=tacobell:7d8c7&[0]targetExpr=gender:
male&[0]targetEntities=(breakfast)&[1]
targetVertical=restaurant&[1]targetQpids=tacobell:7d8c7&
[1]targetExpr=gender:female&[1]targetEntities=(dinner)

The above request is a single HTTP request that describes two individual IDAP requests. In one implementation, all parameters belonging to a particular request are indexed with the same number prefix.

In one implementation, using the IDAP Scala client (see below), the request batching will be performed automatically within the client.

IDAP Scala Client

In one implementation, all IDAP endpoints may be accessed with a native Scala IDAP client. Sample usage may take a form similar to the following example:
import com.qf.IDAP._
import org.joda.time._
import com.github.nscala_time.time.Imports._
def time(f:=>Unit): Long={val
start=System.currentTimeMillis; f;
System.currentTimeMillis
val client=new IDAPClient("IDAP", 3000, 3, 50)
val intentFilter="(@dietpepsi,@pepsi)"
val topics=
Seq(
"(aspartame)",
"(taste)",
"(calories)",
"(diabetes,obesity)",
"(caffeine)",
"(caramel)",
"(sweet)",
"(commercial)",
"(flavor)")")
val topicsWithIntentFilter=topics.map{topic=>s"[$intent-Filter,$topic]"}:+
val demos=
Seq(
//the "all" demo
"1.0",
"gender:female",
"gender:female*(0.7348*age:0to17+0.4709*age:18to24+
1.9957*age:25to29+1.9868*age:30to34+1.483*age:
35to39)",
"gender:male*(0.7348*age:0to17+0.4709*age:18to24+
1.9957*age:25to29+1.9868*age:30to34+1.483*age:
35to39)",
"gender:male",
"ethnicity:white",
"ethnicity:black",
"ethnicity:asian",
"ethnicity:hispanic",
"ethnicity:other")
val geos=
Seq(
"state:VT|CT|NY|PA|RI|NH|MA|NJ|ME",
"state:ND|MN|IA|MI|NE|KS|MO|OH|IN|WI|IL|SD",
"state:WA|OR|CA|AK|HI",
"state: TN|MS|FL|DE|MD|AL|KY|GA|SC|OK|VA|AR|D-
C|WV|NC|TX|LA",
"state:NV|UT|AZ|MT|CO|NM|ID|WY")
val demoWithGeoExpressions=
for {
demo←demos
geo←geos
}yield s"$demo*$geo"
//monthly periods starting from Jan 1st. 20xx
val periods=Stream.iterate(IDAPDates.mkDate(2012, 1, 1))
 (_+1.month).takeWhile}_
time(client.call(
periods.zip(periods.tail).flatMap{case (startDt, endDt)=>
topicsWithIntentFilter.map{topic=>
TotalCountsRequest(
vertical="beverage",
entities=Some(topic),
qpids=Seq("dietpepsi:cd497"),
expressions=demoWithGeoExpressions,
startDate=Some(startDt),
endDate=Some(endDt))
}
}))
client.shutdown( )

Running IDAP Locally

Instructions for running the IDAP locally, in one embodiment:

In one implementation, one or more pack files may be loaded, such as according to the following:
mkdir −p $HOME/data/packedtweets
scp −r dr1:/mapr/mapr-dev/data/packed/onlinetravelservice
 $HOME/data/packedtweets/

In one implementation, all files are obtained (e.g., done.txt)

In some implementations, other verticals may be too big to fully load locally, e.g., on a laptop. Loading a larger vertical (e.g., carrier or beverage) may be accomplished, for example, by using a subset of the pack files. In one implementation, any subset of pack files may be used. In another implementation, any downloaded pack files include at least all dictionary and user_fav_mappings files, e.g., to facilitate entity/fav-based queries.

The following are instructions for starting a master server and/or one or more worker client systems in one embodiment: In an sbt console, switch to the localPtc project, and run re-start. This will start up the master, wait (e.g., 5 seconds) for it to fully start, and then start a worker. After the worker has loaded all of the data, queries may be run against the server. The server may be stopped at any time with re-stop.

In one implementation, when downloading the pack files to a different location, that location may be included as an argument to re-start, eg re-start—packFileDir/Users/imran/pack, e.g.:
localPtc (in build file:/Users/imran/qf/git/qfish/)
started
in the background . . .
packed.PackedTweetLocal.main( )
packed.PackedTweetLocal$: creating
INFO packed.PackedTweetLocal$: master created
INFO packed.PackedTweetLocal$: starting master . . .
INFO packed.PackedTweetLocal$: waiting for master to be up
INFO packed.PackedTweetReader$: finished reading dictionary!
INFO packed.PackedTweetLocal$: starting worker
11.669] [Cluster.System-akka.actor.default-dispatcher-3] [akka://ClusterSystem/user/master In one implementation, a plurality of queries may be run, and then re-stop may be run to stop it (e.g., hit enter once to get an sbt prompt), e.g.:
localPtc>re-stop
[info] Stopping application localPtc (by killing the forked JVM) . . .
localPtc . . . finished with exit code 143
[success] Total time: 1 s, completed Jun 10, 20xx 8:24:11 AM
localPtc>
Naming In one implementation, apparatuses, methods and systems discussed herein may be referred to as a "PTC" (Packed Tweet Cluster).

FIG. 1 shows an implementation of data flow for data compacting in one embodiment of IDAP operation. An input comprising one or more raw data input records 102 may, in one implementation, comprise raw text records, JSON records, and/or the like with metadata such as, but not limited to, timestamp, username, location, and/or the like (e.g., social media comment, other forms of unstructured text). The input comprising one or more raw data input records 102 may, in one implementation, be passed to downstream components (e.g., Packed Record Writer 105 comprising Field Selector 107 and Record Compactor 109) to be compacted into binary format for use in efficient search and analysis applications, subroutines, data feeds, and/or the like. In one implementation, compacting the records into a binary format as discussed herein reduces the size, e.g., by approximately 72%. In one implementation, not all fields from the original raw data are preserved; only those associated with a domain of interest. For example, in one implementation, the raw records may have certain fields selected (e.g., comment identifier, user identifier, text, timestamp, metadata, and/or the like), such as by a Field Selector module 107, which may then be passed to a record compactor module 109 for translating into a more optimized bit-packed format 110, as described in further detail herein. This bit-packed data 110 may then, in some implementations, be later read and/or consumed by other parts of the IDAP and/or used as the source data when responding to incoming queries.

FIG. 2A shows an implementation of data structure for compacted data in one embodiment. A raw data record (e.g., JSON record) may be converted into a compact binary format, such as the example illustrated in FIG. 2, via a custom binary protocol which may include one or more optimizations to compact data more tightly. In one implementation, each record has a fixed header along with a set of known fields and/or values (e.g., certain fields may be 64-bit SIP hashed rather than storing full text). Fields that can be one of a fixed number of values may be represented, in one implementation, by a smaller type (e.g., a Byte, a Short, and/or the like). In one implementation, user records and comment records may be packed separately. In one implementation, the compacted representation may include a "tags" field comprising a bit vector of enabled/disabled flags, with the corresponding raw JSON record represented in a significantly more verbose manner using multiple attributes and/or fields. The illustrated implementation includes at least: a Header field (2 bytes) 201; a User ID field (8 bytes) 205; a Timestamp field (8 bytes) 210; a Num Text Bytes field (2 bytes) 215; a Text Bytes field (Num Text Bytes*1 byte) 220; a Num Terms field (2 bytes) 225; a Terms field (Num Terms*8 bytes) 230; and/or additional fields 235. In one implementation, certain fields may be configured as 64-bit SIP hashed, e.g., as an alternative to storing full text. In one implementation, fields that are one of N values may be stored in a smaller type (e.g., Byte/Short).

In another implementation, different types of packed records may be generated, maintained, accessed, analyzed, and/or the like within embodiments of IDAP operation. For example, in one implementation, the IDAP may include both packed comment records and packed comment records. In an implementation, a packed comment record may be constructed based on a schema and/or protocol having a form similar to the following example:
Header (2 bytes)
Sequence number (2 bytes)
Tags (2 bytes)
Timestamp (8 bytes)
User identifier (8 bytes)
Comment identifier (8 bytes)
US State (1 byte)
Number of terms (2 bytes)
Terms (number of terms*8 bytes)
Plurals bit set (based on number of terms)
Number of qpids (1 byte)
Qpids (number of qpids*2 bytes)
Number of consumer qpids (1 byte)
Consumer qpids (number of consumer qpids*2 bytes)
Number of text characters (2 bytes)
Text characters (number of UTF-8 encoded bytes)

In this example, Qpids may comprise product identification codes. In another implementation, a packed user record may be constructed based on a schema and/or protocol having a form similar to the following example:
Header (2 bytes)
Max sequence number (2 bytes)
Gender/male probability (4 bytes)
Gender/female probability (4 bytes)
Ethnicity/white probability (4 bytes)

Ethnicity/black probability (4 bytes)
Ethnicity/hispanic probability (4 bytes)
Ethnicity/asian probability (4 bytes)
Ethnicity/other probability (4 bytes)
Age/under18 probability (4 bytes)
Age/from18to20 probability (4 bytes)
Age/from21to24 probability (4 bytes)
Age/from25to29 probability (4 bytes)
Age/from30to39 probability (4 bytes)
Age/from40to49 probability (4 bytes)
Age/over50 probability (4 bytes)
Geo (1 byte)
Num favs (4 bytes)
Favs (number of favs*8 bytes)

In one implementation, Compact Terms are packed into memory according to the smallest number of bytes needed to store the compact term integer. Compact term values from 0 to 255 are stored in one byte, values from 256 to 65535 are stored in two bytes and values from 65536 to 8388607 are stored in three bytes. In one implementation, values over 8388606 are assigned the special compact term value 8388607 which is used to indicate an unmatchable term (no match term). In this way, the most common terms are represented by the smallest storage, reducing the average memory storage needs for terms.

In one implementation, text filtering may employ efficient comment queries using both single and multi-term phrases. To support single term queries, the compact terms are stored in a sorter order, allowing for binary searching. To support multi-term queries, the original term order is made available to compare adjacent terms. Therefore, the in-memory compact is composed of the following four parts:

A three byte header. In one implementation, the first byte of the header is the total number of terms in the comment text. Up to 255 terms are supported. Any terms beyond the 255th term are not included and unavailable for matching. The second byte of the header is the number of single byte (compact term values 0-255) terms. The third and final byte of the header is the number of two byte (compact term values 256-65535) terms. The number of three byte (compact term values 65536-8388607) compact terms can be determined by subtracting the sum of the single byte term count and the two byte term count from the total term count (3_byte_terms=total_terms−(1_byte_terms+2_byte_terms)).

The sorted compact terms. In one implementation, the next L bytes contains the compact terms in sorted order, where L=(1 byte*1_byte_terms)+(2 bytes*2_byte_terms)+(3 bytes*3_byte_terms). The first 1_byte_terms bytes are all of the single byte compact terms in order from the lowest to highest. The next 2*2_byte_terms bytes are the two byte compact terms in order from lowest to highest. Finally, the last 3*3_byte_terms bytes contains the three byte compact terms from lowest to highest. Terms that occur more than once in the original text are repeated as adjacent compact terms in the sorted order, one for each occurrence of the term in the original text.

The sorted to original order mapping. In one implementation, the next total_terms bytes represents the mapping between the sorted order and the original order of terms in the comment text. The value of the ith byte in this sequence of bytes will be the 0-based index of the original term position for the ith sorted compact term. The first byte will hold the original position of the first compact term in the sorted compact term section. The final byte will hold the original position of the last compact term in the sorted compact term section. Together, these bytes create a way to map from the sorted compact terms to the corresponding original positions.

The original to sorted order mapping. In one implementation, the next total_terms bytes represents the mapping between the original order of terms in the comment text and the sorted order of compact terms. The value of the ith byte in this sequence of bytes will be the 0-based index of the sorted compact term for the ith original position of the compact term. The first byte will hold the sorted position of the first compact term in the original text. The final byte will hold the sorted position of the last compact term the original text. Together, these bytes create a way to map from the original order of compact terms to the sorted order.

Figure 2B:
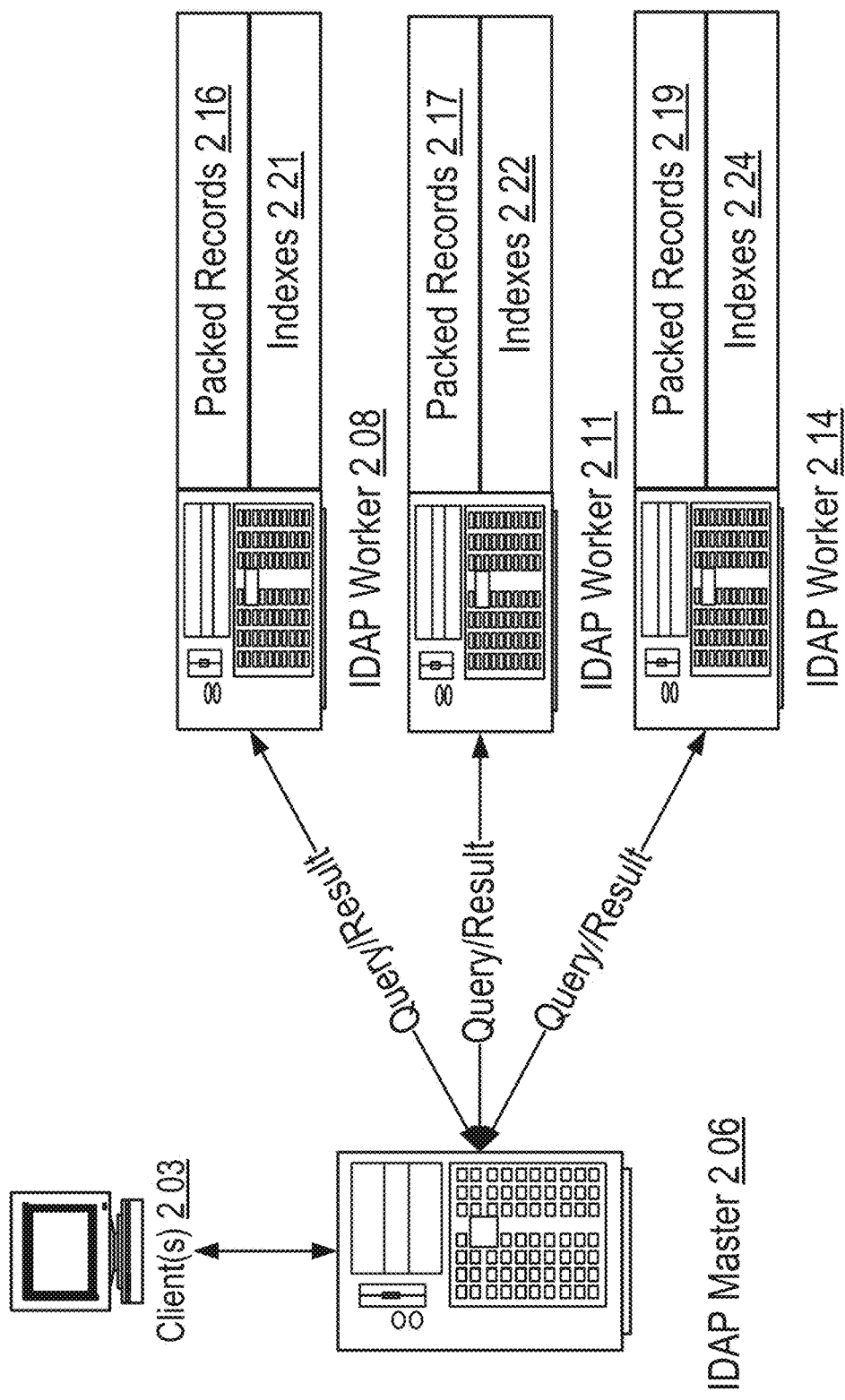
FIG. 2B shows an implementation of data flow for query processing in one embodiment of IDAP operation.

FIG. 2B shows an implementation of data flow for query processing in one embodiment of IDAP operation. In one implementation, packed records produced via a process such as the example shown in FIG. 1 may be distributed to worker nodes for computing over a portion of those packed records. In one implementation, the master node keeps track of IDAP workers and handles incoming queries. In one implementation, the master node orchestrates the process of assigning shards of compacted data to IDAP workers and routes requests to the appropriate request handler. In one implementation, the IDAP master distributes groups of pack files to IDAP workers once they register with the master (via Akka Cluster). In one implementation, each IDAP worker loads a portion of the compacted data and builds certain indexes across certain facets of the binary records.

A client system 203 may, for example, submit raw data (e.g., JSON records) to an IDAP master server 206 for processing and/or conversion into packed records, compacted records, pack files, and/or the like (216, 217, 219) for storage and/or processing by one or more IDAP worker systems (208, 211, 214). In one implementation, the master node keeps track of IDAP workers and handles incoming queries. In one implementation, the master node orchestrates the process of assigning shards of compacted data to IDAP workers. Packed records information may further be processed and/or analyzed to yield one or more indexes (221, 222, 224) to facilitate retrieval and/or provision of information in response to one or more queries, such as may be relayed by the IDAP master 206, received from the client system 203, and/or the like. In one implementation, each IDAP worker loads a portion of the compacted data and builds certain indexes across certain facets of the binary records. In one implementation, IDAP workers (208, 211, 214) may be configured to allow building of custom facet indexes while loading pack files, compacted records, and/or the like. For example, a tree map may be constructed, such as according to TreeMap[Long, Array[Long]], where timestamps are used as keys and values are offsets to off-heap records occurring at that time. An example of a routine for use in connection with off-heap binary searching may, in one implementation, take a form similar to the following:

```
def binarySearch{
    unsafe: Unsafe,
    offset: Long,
    fromIndex: Int,
    toIndex: Int,
    searchTerm: Long) : Int = {
    var low = fromIndex
    var high -= toIndex - 1
    var search = true
    var mid = 0
    while (search && low <= high) <
```

```
            mid = (low + high) >>> 1
            val term = unsafe.getLong (offset + (mid << 3))
            if (term < searchTerm) low - mid + 1
            else if (term > searchTerm) high = mid - 1
            else search = false
        }
        if (search) - (low + 1) else mid
    }
```

Offsets may then, in one implementation, be only processed when they satisfy the applicable date range. In one implementation, data is not materialized unless it is needed to satisfy a particular incoming request. For example, in one implementation, a full social comment or user record is no materialized (e.g., pulled into memory), but rather only those fields that are needed for a given incoming request. In one implementation, binary searches are performed on sorted items in off-heap memory. In one implementation, raw data records may be received from a different client system from the one that later submits a query. In one implementation, the raw data records may be received and/or processed internally in the IDAP master 206, may be received and/or processed at one or more IDAP workers (208, 211, 214). In one implementation, a Java Virtual Machine application toolkit, such as Akka Cluster, may be utilized for distributed communication between IDAP master 206 and IDAP workers (208, 211, 214).

In one implementation, queries are distributed in a map/reduce approach from the IDAP master to each of the IDAP workers. An example of a query that queries the IDAP for a time series (e.g., data points) for the first five days of 2014 against the "automobile" vertical of social media records that contain the term "fast" and the term "car" may take a form, in one embodiment, similar to the following example:
http://rtc:3000/timeseries?targetVertical=
automobile&targetStartDate=2014-01-01&targetEndDate=2014-01-06&targetTerms=[fast,car]

An example of a response that this query could elicit, in one embodiment, may take a form similar to the following example:

```
[ {
        "group" : 0,
        "groupTs": [ {
            "expr": "all",
            "ts" : [ {
                    "date" : "2014-01-01"
                    "count" : 137.0
            }, {
                    "date" : "2014-01-02"
                    "count" : 188.0
            }, {
                    "date" : "2014-01-03"
                    "count" : 212.0
            }, {
                    "date"2014-01-04"
                    "count" : 175.0
            }, {
                    "date" : "2014-01-05"
                    "count" : 168.0
            } ]
        } ]
} ]
```

Figure 3:
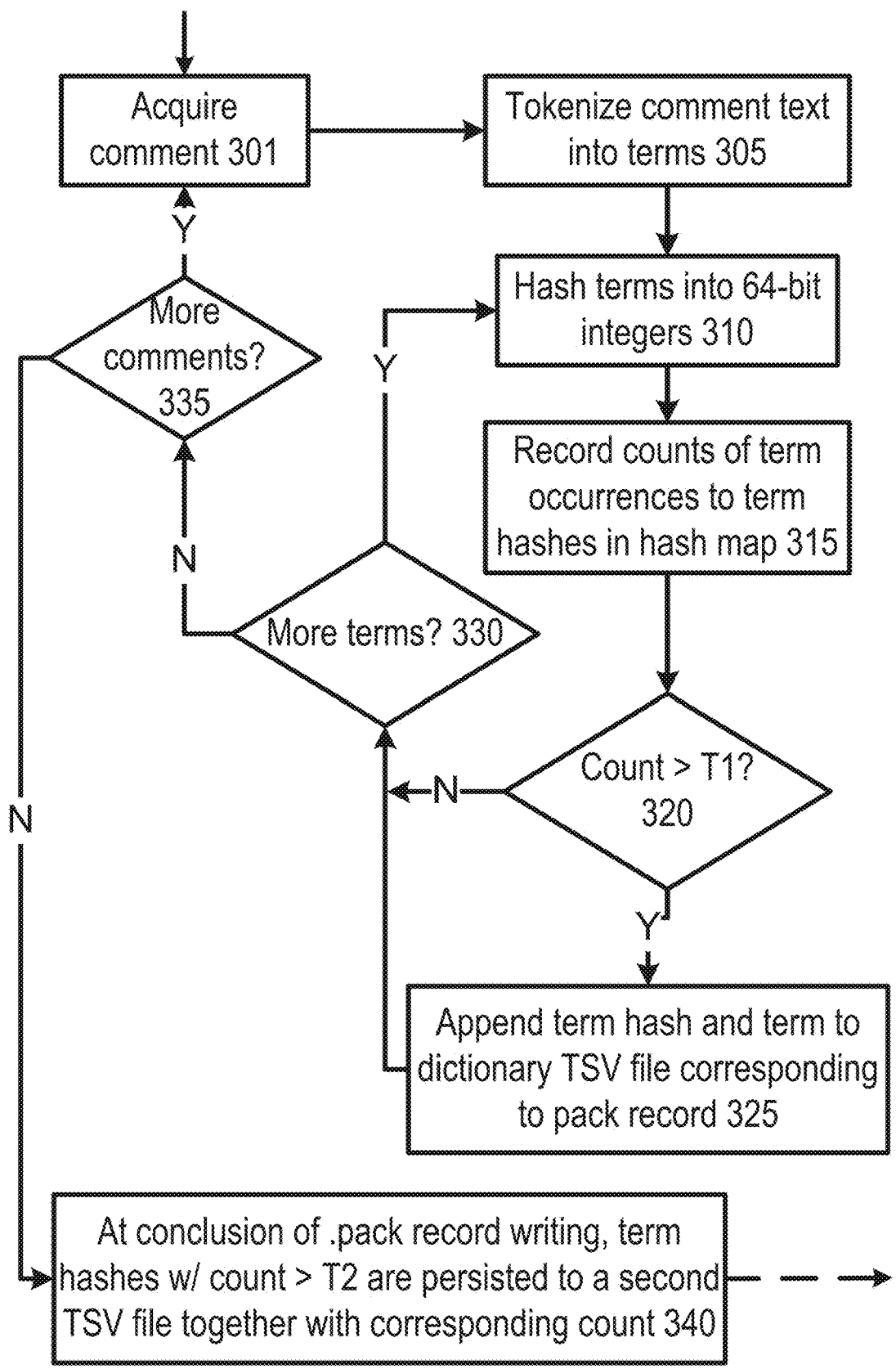
FIG. 3 shows an example of logic flow for pack file generation in one embodiment of IDAP operation.

FIG. 3 shows an example of logic flow for pack file generation in one embodiment of IDAP operation. In one implementation, a pack file writing component of the IDAP system may perform pack file writing offline to consume a raw annotated data set and pack social comments and user records into the custom binary protocol/format (pack files), making it more readily distributable across IDAP worker nodes. During the pack file writing, the set of unique terms and the corresponding term occurrence counts are collected for all comments, e.g., in a given domain (vertical). For pack file's writing, during the processing of a comment 301, text is tokenized into terms 305. These terms are hashed, such as into 64-bit integers 310 using the SipHash 2-4 algorithm (C reference implementation here: https://131002.net/siphash/siphash24.c, incorporated in its entirety herein by reference). These hashes are stored in the comments written to the pack files. The counts of occurrences of each term are tracks by using a hash map that maps the term hash to the count value 315. This value is incremented by one for each occurrence. When the count for a term reaches a low threshold (T1, default 1) 320, the term hash and the term are appended to a dictionary TSV file corresponding to the pack file 325. At the conclusion of the of the pack file writing, when there are no more terms 330 and, in some implementations, no more comments 335, the term hashes with counts greater than or equal to the threshold value (T2) are persisted to a second TSV file (counts file) along with the corresponding count 340. In one implementation T2=T1. In another implementation, T2>T1. The count TSV may be used for remaining steps.

Figure 4:
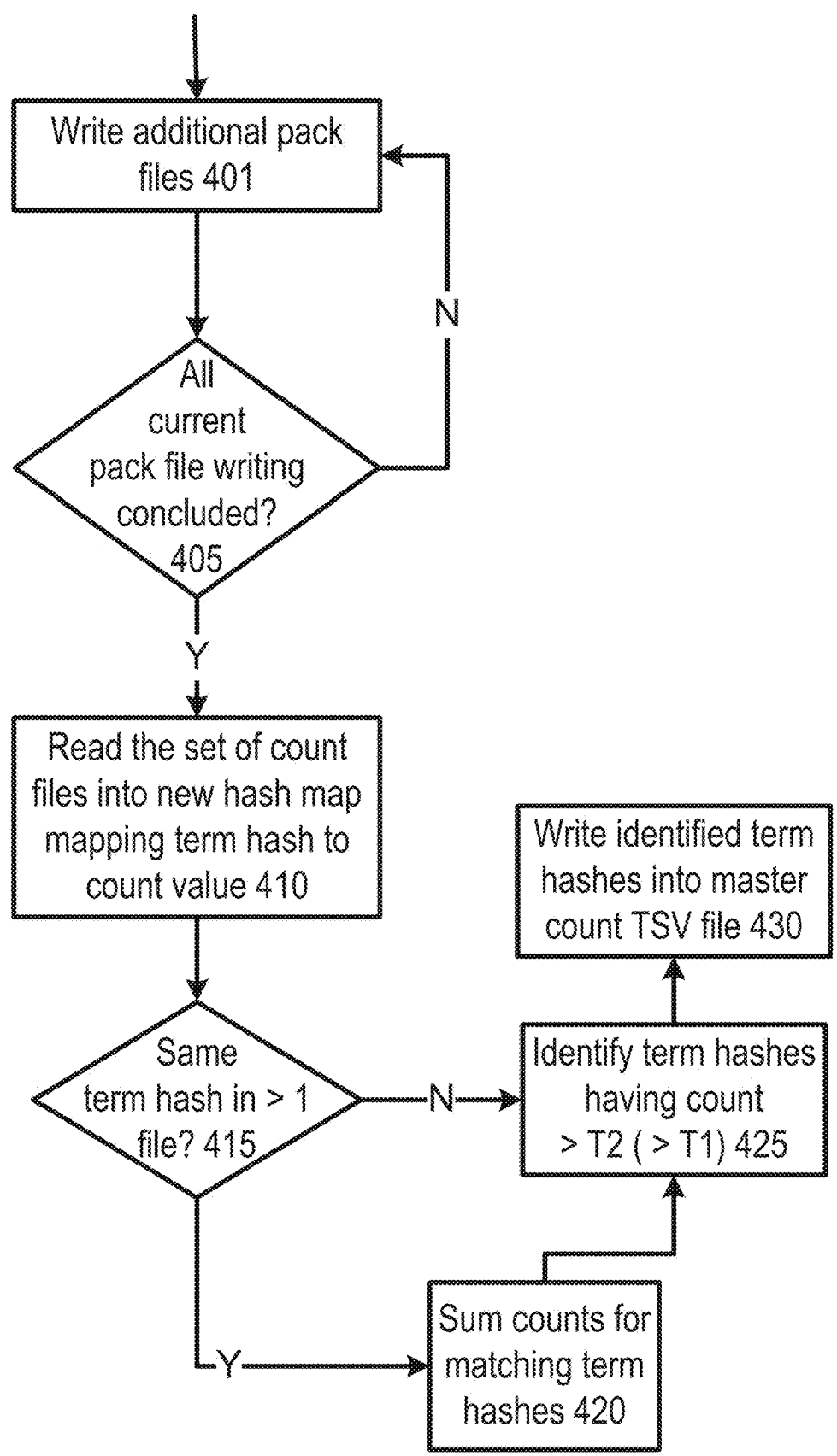
FIG. 4 shows an example of logic flow for master count file generation in one embodiment of IDAP operation.

FIG. 4 shows an example of logic flow for master count file generation in one embodiment of IDAP operation. In one implementation, each additional pack file may be prepared and/or collected 401, and a determination made as to whether all current pack file writing has concluded 405. At the conclusion of the writing of all pack files, the set of count files are read into a new hash map that again maps the term hash to the count value 410. When the same term hash occurs in two or more count files 415, the counts are summed 420. After all of the count files are read and accumulated, the entries whose counts are greater than or equal to a larger threshold (T2, default 50) 425 are written to a master count TSV file 430. The set of all dictionary files are combined into a single master dictionary file with duplicate entries or entries whose corresponding count is less than T2 omitted.

In one implementation, for each IDAP worker loading a vertical's pack files, the term dictionary and count files may be read into memory and/or stored in two hash maps. The first hash map may, for example, map the term has to count (count map) while the second hash map may, for example, map the term hash to the term (dictionary map).

Figure 5:
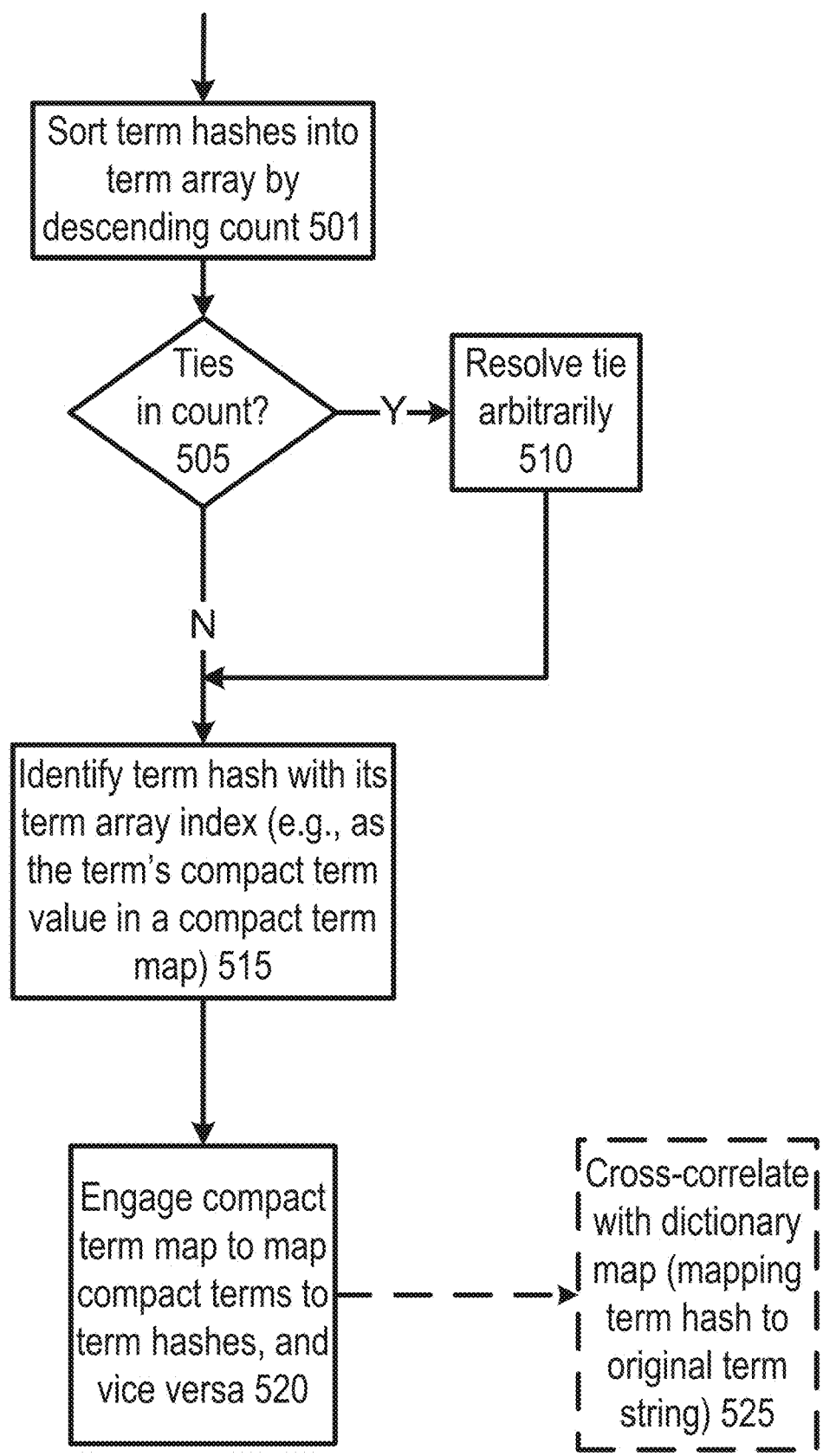
FIG. 5 shows an example of logic flow for map generation and use in one embodiment of IDAP operation.

FIG. 5 shows an example of logic flow for map generation and use in one embodiment of IDAP operation. In one implementation, the term hashes are sorted into an array (term array) by count descending 501, with ties identified 505 and, e.g., resolved arbitrarily 510. In another implementation, ties may be resolved based on other criteria, alphabet, chronology, and/or the like. The index of a term hash in this term array becomes the compact term value for that term 515. A map (compact term map) that maps the term hash to term array index (called compact term from now on) is created. The compact term map can be used to map a term hash into a compact term 520. The term array can be used to map a compact term back into its term hash. When combined with the dictionary map, in one implementation, the term hash can be mapped back to the original term string 525.

Figure 6A:
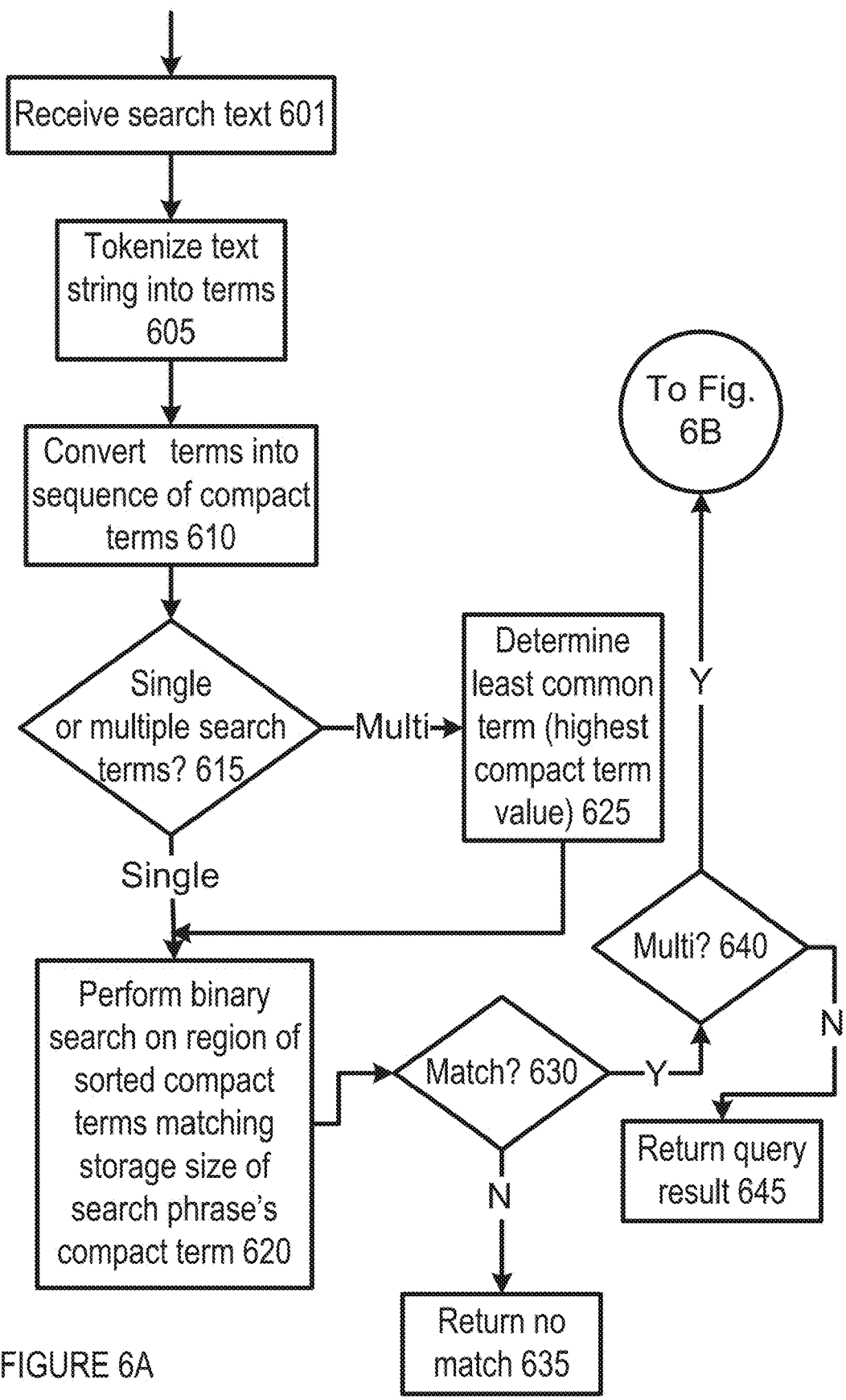
FIGS. 6A-6D show examples of logic flow for query processing with compact term search phrases in embodiments of IDAP operation.

FIG. 6A shows an example of logic flow for query processing with compact term search phrases in one embodiment of IDAP operation. In one implementation, compact term search phrases are used to determine if a given comment's text matches some given search text. The input search text 601 is tokenized into terms 605, e.g., using the same mechanism that was used to tokenize the comments for the given vertical being searched. The resulting terms may be converted into a sequence of compact terms 610, e.g., using the SipHash 2-4 and compact term map (from part 2). In one implementation, the matching behavior depends on the number of terms in the search phrase 615.

Single search term. When the search phrase is composed of a single term, a binary search is performed on the region of the sorted compact terms that matches the storage size of the search phrase's compact term 620. If the compact term is in the single byte range (0-255), the single byte compact terms are binary searched. If the compact term is in the two byte range (256-65535), the two byte compact terms are binary searched. If the compact term is in the three byte range (65536-8388607), the three byte compact terms are binary searched. If any match is found (and the search is not multi 640) the comment is determined to match the query 645; otherwise it does not match 635.

Multiple search terms. When the search phrase has more than one term 640, the least common term (the highest compact term value) is determined. A binary search is performed on the region of the sorted compact terms that matches the storage size of the search phrase's least common compact term in the manner described in the single search term section. If no match is found, the comment cannot match the search phrase. The least common term is used to increase the likelihood of early search failure in this step or any steps below. Otherwise If a match is found, the matching index (j) 650 is used to determine if the phrase match by examining the adjacent terms in both the phrase and the original text.

Figure 6B:
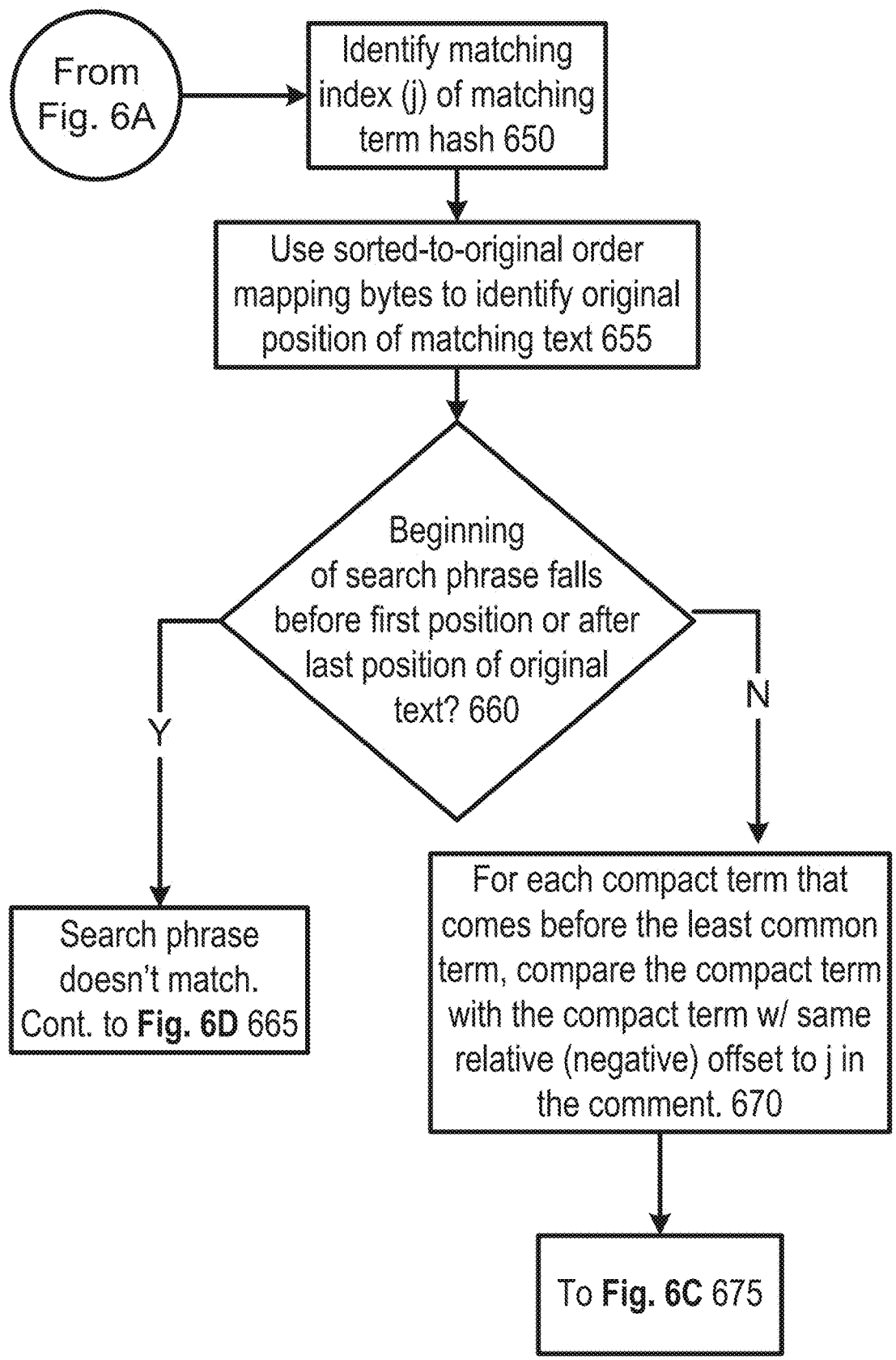
Figure 6C:
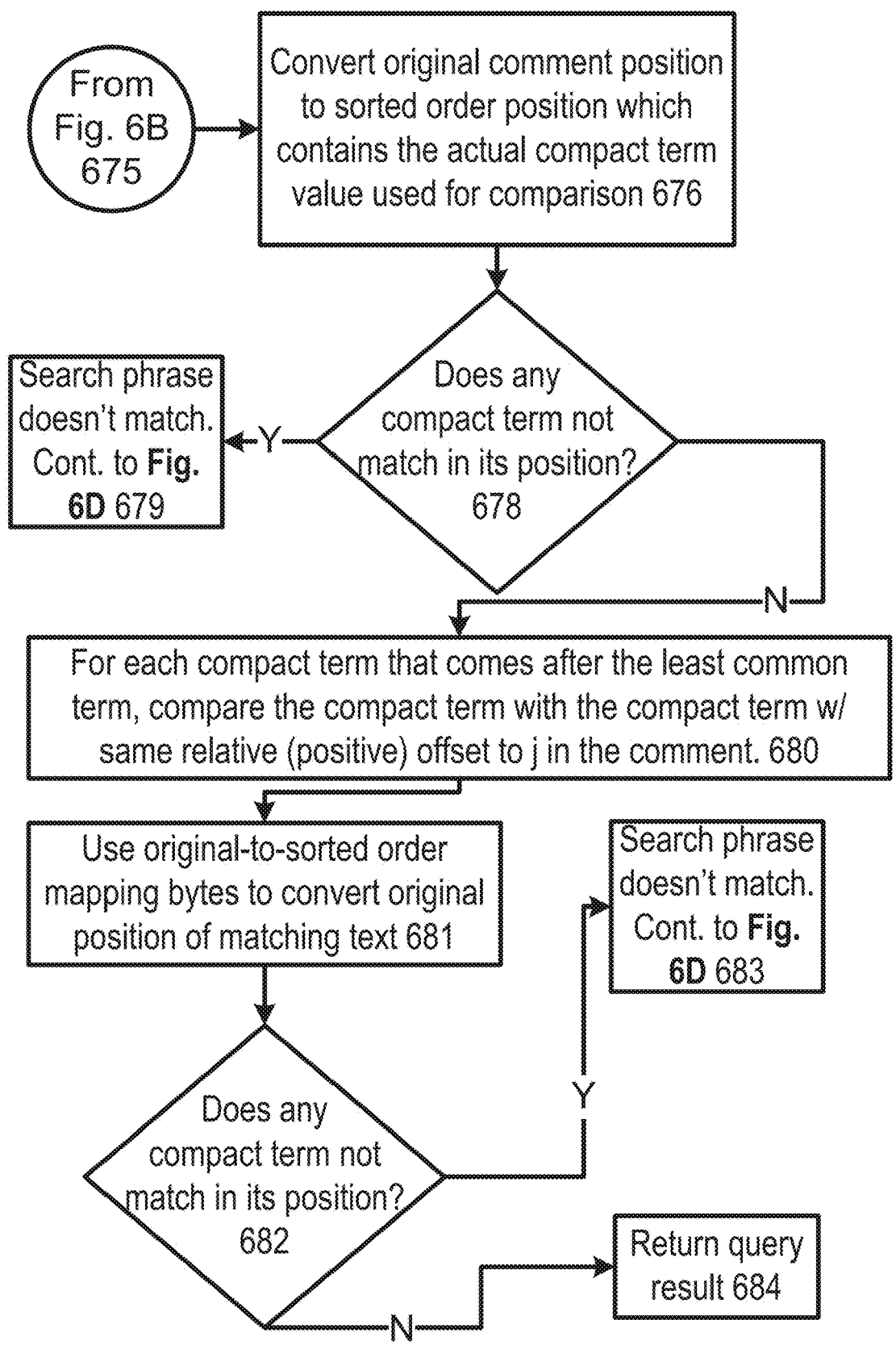
Figure 6D:
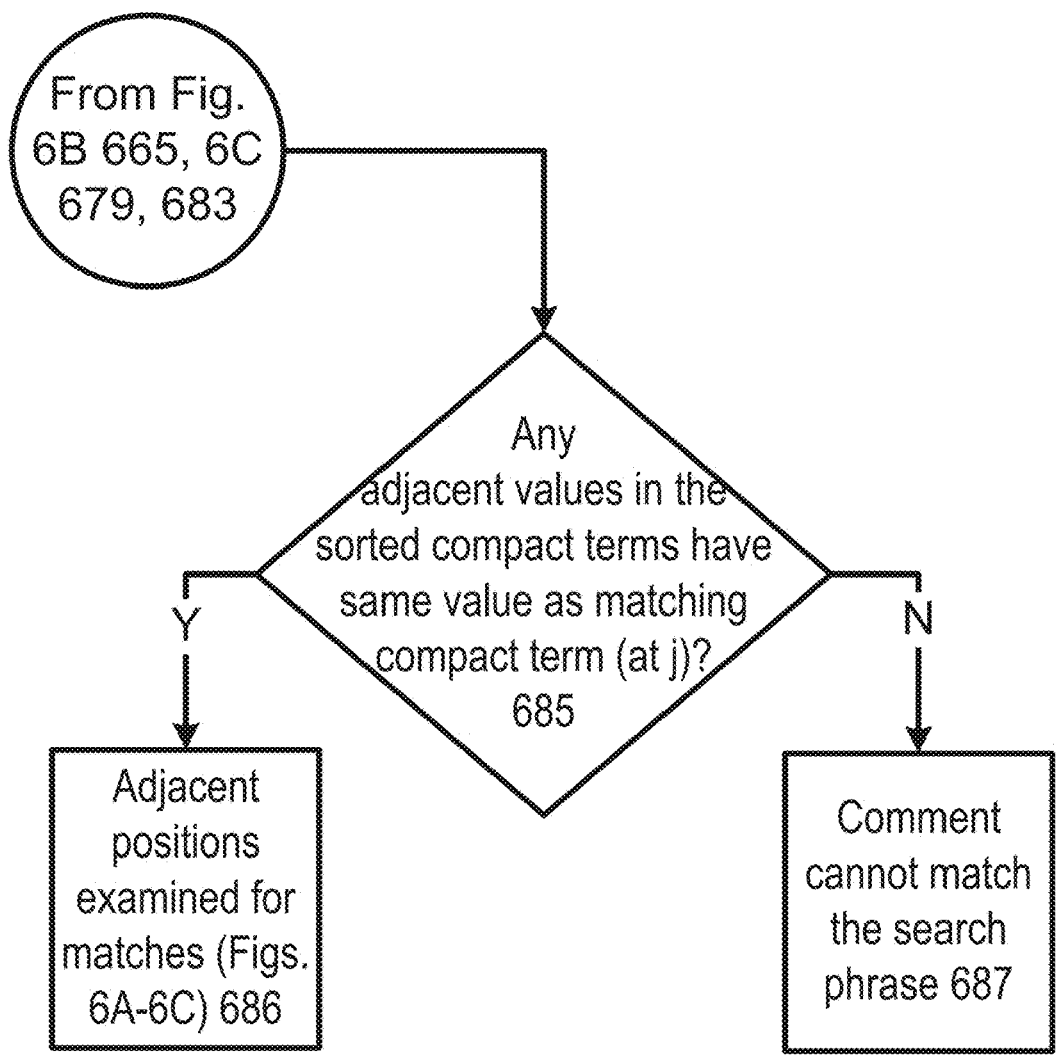

Using the sorted to original order mapping bytes, the original position of the matching index (j) may be determined 655. Based on this position, a quick determination can be made 660 to tell whether the beginning of the search phrase would fall before the first position or after the last position of the original text. In either of these cases, the search phrase cannot match in this position and the search may continue with a repeated term as described in FIG. 6D below.

Otherwise, for each compact term that comes before the least common term, the compact term is compared with the compact term with the same relative (negative) offset to j in the comment 670. The original to sorted order mapping bytes are used to convert the original comment position to the sorted order position which contains the actual compact term value used for comparison 676. The first compact term that does not match will indicate that the search phrase cannot match in this position 678 and the search may continue with a repeated term as described in FIG. 6D below 679. Otherwise if all compact terms that come before the least common term match with the corresponding compact terms in the original text, the search continues.

For each compact term that comes after the least common term, the compact term is compared with the compact term with the same relative (positive) offset to j in the comment 680. The original to sorted order mapping bytes are used to convert the original comment position 681, e.g., to the sorted order position which contains the actual compact term value used for comparison. The first compact term that does not match will indicate that the search phrase cannot match in this position 682 and the search may continue with a repeated term as described in FIG. 6D below 683. Otherwise if all compact terms that come after the least common term match with the corresponding compact terms in the original text, the match succeeds and the comment is determined to match the search phrase 684.

If this point is reached, alternative positions for matches are investigated. Positions in the sorted compact terms adjacent to j may contain other matches for the least common term in the search phrase. If any adjacent values in the sorted compact terms have the same value as the matching compact term (at position j) 685, these adjacent positions are examined for matches using the facilities discussed in FIGS. 6A-6C above 686. If there are no adjacent positions with matching compact term values or all adjacent terms with the same compact value fail to match in FIGS. 6A-6C above, the comment cannot match the search phrase 687.

In one embodiment, this design decreases the storage requirements from 2+(8*total_terms) bytes when storing the term hashes to 3+(r*total_terms) bytes when using the compact terms where r is an average between 3 and 5. Given the frequency bias towards smaller storage for the most common terms, the values of r is close to 3 in practice, typically around 3.2. This achieves an approximately 60% reduction in the bytes needed to store the terms. Further, the search performance is much faster than a linear scan when single terms used or multiple terms are used and the least common term does not match any term in the majority of comments.

Insight Discovery and Presentation

An IDAP system may be configured, in some embodiments, to receive and analyze a corpus of data (e.g., documents, forms, feeds, and/or the like structured and/or unstructured data), extract factors most responsible for driving one or more global metrics, distill data about those factors into one or more prose statements, and provide those statements for display at a client terminal and/or via a report.

Figure 7:
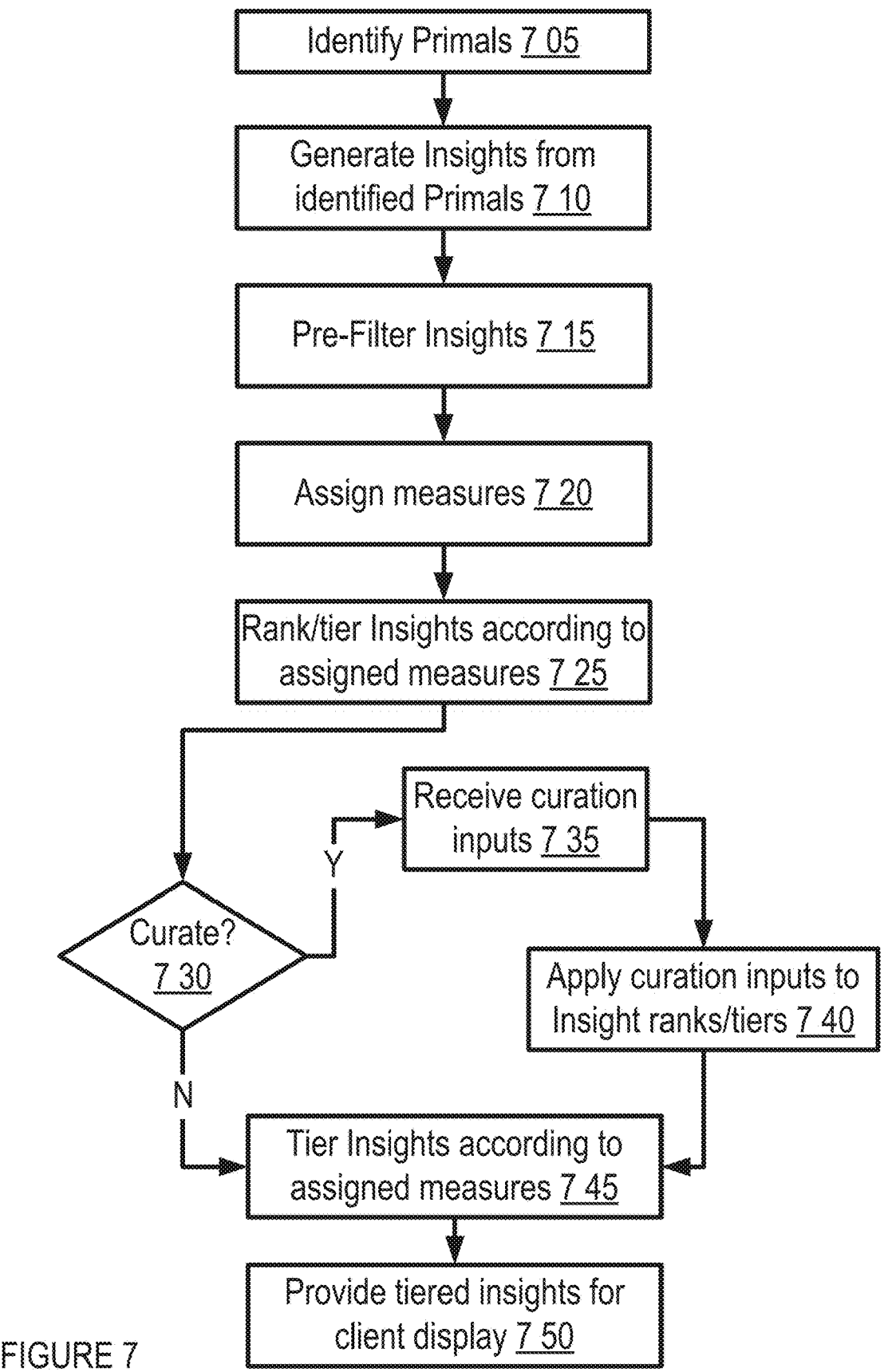
FIG. 7 shows aspects of logic flow for an embodiment of insight discovery and presentation.

FIG. 7 shows aspects of logic flow for an embodiment of insight discovery and presentation. A collection of primals may be identified and/or selected 705, such as according to the availability of primal data in a corpus of documents; client and/or presentation preferences and/or requirements; and/or the like. Non-limiting examples of primals may include topics, demographic groups, competitor groups, time, and/or the like. In one implementation, a client-specific ontology, comprising a collection of data relationships and/or connections between terms, topics, primals, and/or the like (e.g., via primary/foreign key fields in a relational database configuration), may be provided to the IDAP for use in further processing.

Collected primals may then be used to generate a plurality of insights 710. In one implementation, an insight comprises a relationship between primals and/or primal information. Non-limiting examples of primals and insights are provided for illustrative purposes in FIGS. 11A-11D. In one implementation, a fixed number (e.g., 10-15) of possible insights are pre-configured, and all possible insights are generated using available primal information. In another implementation, a subset of all possible insights are generated with available primal information, such as according to pre-generation criteria, primal data availability, client preference, and/or the like. In one implementation, insight data may include and/or be associated with additional information associated with the insight and/or related insights, with such data being available for presentation in a drill-down mode (e.g., made available by selection of the insight at the client interface). In one implementation, a natural language insight may be generated by populating an insight template associated with the insight record with primal data values also associated with the insight record. For example, primal data values associated with a topic (e.g., "customer service"), a demographic (e.g., "males age 18-25"), and a brand (e.g., "Soda Brand 1") may all populate a template, along with the primal trend data (e.g., "less important") to give an insight such as "Customer service is less important for males age 18-25 purchasing Soda Brand 1." In another implementation, an insight template may be employed to identify related primals, e.g., according to client interest.

Generated insights may then be pre-filtered according to a variety of criteria 715. For example, in one implementation, a blacklist filter may be applied to remove and/or modify statements determined to be unsuitable for presentation, such as based on confidence criteria and/or other criteria and/or rules. In another implementation, one or more colinearity filters may be applied, such as in order to determine if an insight identifies a specific property of a primal category of interest (e.g., males aged 18-25) or of a broader category encompassing the sub-category (e.g., all males), possibly discarding or demoting the insight in the latter case. In another implementation, one or more confidence filters may be applied, such as to sort, discard, and/or demote insights based on the volume of underlying corpus documents involved, based on the significance (e.g., statistical significance) of the relation between primals in the document corpus, and/or the like.

Filtered insights may then be ranked, such as by assigning one or more ranking measures 720 and ranking and/or tiering the insights according to the evaluated values of the measures for those insights 725. Tiering may be accomplished, for example, by determining an insight rating score based on the ranking measures and comparing that score to one or more tier thresholds. In some embodiments, rankings and/or ratings may be made based on a variety of factors, such as but not limited to: degree and/or direction of change of a primal value and/or relationship; change of a primal value with respect to a reference; insight diversity; association of primals to client interest (e.g., according to a rules-based system); insight actionability (e.g., the likelihood and amount that a primal and/or primal trend associated with the insight can be changed, such as based on a calculation of primal elasticity, a rules-based system, and/or the like); likely return-on-investment ("ROI") (e.g., according to an evaluation of actionability and associated action costs); and/or the like. In one implementation, insight records may be associated with one or more action records, the action records defining an action to take in response to the insight. Action records may be employed, for example, to generate an action-item report of recommended actions in association with a given set of insights. In another implementation, action records may be configured to automatically implement one or more actions in response to the detection of an insight (e.g., automated ad purchase and/or placement in response to the identification of a particular insight trend).

A determination may then be made as to whether the ranked and/or tiered listing of insights should be further curated 730. If so, curation inputs are received 735 and applied 740 to the insight ranks and/or tiering. For example, in one implementation, a system administrator may be allowed to manually adjust insight rankings and/or tiers. Insight tiers and/or rankings are adjusted and assigned 745 and provided for display 750, such as at a client terminal via an electronic communication network.

In one embodiment, an IDAP module (e.g., the Filtering/Ranking Component 1147) may generate a set of insights in every time period (e.g., hourly, daily, weekly, monthly, according to a user-customized period, and/or the like), on a triggered basis, on demand, and/or the like. In one example, the top insights for a given time period may be exposed to the customer, such as via a client interface. The user may then perform further operations on each insight to drill down to additional facts or information associated therewith, access related insights, and/or the like.

In one embodiment, a process for generation of insights, top insights, and/or the like may include insight generation, pre-filtering, assignment of measures, tiering, curation and/or publishing of results, and/or the like. In one implementation, a generation layer may generate all possible combinations of insights over all types. In one implementation, a pre-filtering layer may apply one or more filters, such as a "blacklist filter" to prune disallowed statements, low-confidence statements, and/or other undesirable results. In one implementation, a measure assigning layer may, for each insight, assign measures such as, but not limited to, a relevance points (e.g., a Boolean score identifying whether or not an insight qualifies as relevant to a particular user input), a strength score (e.g., classifying the relative strength of the insight in relation to a particular user input, other related insights, and/or the like), and/or the like.

In one implementation, a tiering layer may apply rules and/or logic over measures to break insights into tiers. For example, in one implementation, a top tier may include insights as instructed by rules and/or logic for presentation to the client display. In one implementation, a second tier may be identified and/or prepared for presentation (e.g., to client services, reporting module, backend diagnostics and/or monitoring services, and/or the like). In one implementation, within each tier, insights may be sorted according to a strength score and/or classification. In one implementation, the strength score and/or classification may be reflected in client-side display presentation, such as in the form of a numerical score, Boolean score, discrete labeling, color-coding, highlighting, and/or the like. In various implementations, some or all of the tiering, sorting, and/or scoring of insights may be included in one or more reports and/or may be persisted in data records associated with the insights, user account, query, and/or the like.

In one implementation, a curation and/or publishing layer may expose insights (e.g., with one or both of measures and/or tiering information included) to a client-side display, to a client services display, reporting module, backend monitoring and/or diagnostics, and/or the like. In one implementation, insights presented to a client services display may be manipulated, such as to allow manual assignment of one or more insights to one tier or another, adjustment of measures, strength scores, strength classifications, and/or the like.

In one implementation, a pre-filtering layer may apply rules and/or logic by which insights are filtered out. Pre-filtering may, in some implementations, filter out insights as they are generated by the generation layer and/or may apply filters at a later stage of processing. In one implementation, the pre-filtering layer may apply confidence interval filters, such as non-time statements and/or time statements. Non-time statements may, for example, include a confidence interval overlap check, whereby an insight is discarded if there is an overlap between the confidence interval for it and a contrary insight (e.g., if a topic intent fraction for soda brand 1 for aspartame overlaps one for soda brand 2, the insight "Aspartame is important for consumers driving soda brand 1 churn relative to soda brand 2" is discarded). In another example, non-time statements may include a significance check, whereby an insight is discarded if an occurrence count if less than a threshold (e.g., the insight "Bottle is stronger for customers driving beer brand 1 sales compared to beer brand 2" is discarded unless topic "Bottle" has a count above a threshold limit). In one implementation, time statements may, for example, include a zero-interval test, whereby a check is made as to whether a topic intent fraction actually increases or decreases over time and/or in conjunction with changes in a secondary variable. In one implementation, an insight may be discarded unless a zero-interval test indicates an increasing intent fraction across at least two points in time. In one implementation, time statements may, for example, include a confidence interval check for changes in topic intent fraction, e.g., for a given brand and a given competitor brand, to check for overlap. In one implementation, such a time statement confidence interval overlap check may be implemented in a manner similar to the non-time statement confidence interval overlap check described above.

In one implementation, pre-filtering may include filtering based on a change in counts. For example, the counts (e.g., of occurrences in a corpus of documents) governing a particular statement, insight, and/or the like, may be compared to a threshold limit to determine whether or not to filter them out, e.g., from client presentation.

A variety of measures may be assigned in a measure assignment layer, such as but not limited to relevance points, strength score and/or classification, and/or the like. In one implementation, relevance points and/or a relevance score may take integer values. Relevance points may be assigned, for example, to account for and/or add up points of one or more conditions that are to be satisfied in order to identify and/or label desirable and/or displayable insights. In one implementation, such conditions and/or the associated assignment of relevance points may be established based on evaluation of the relevance of prior insight results, user-feedback of such relevance, client services feedback, manual adjustment of relevance ratings, and/or the like. In one implementation, relevance points may be collapsed into a single and/or small number of metrics (e.g., a sum of relevance points).

In one implementation, heuristic points may be assigned to one or more insights. Heuristic points may, in one implementation, be associated with relevance and/or be used in the determination of relevance points. For example, in one implementation, a statement, insight, and/or the like may receive a point for each condition that applies to it, such as any of the following: time based statements (t); topic based statements (TC/TDC, TD and their t variants); recentness of statement (e.g., measured by the age of the statement, when the statement was first true, and/or the like); target topic; competitive statements (C primal statements); target demographic; and/or the like. In some implementations, point assignment for conditions may be weighted, with some conditions contributing more points than others, such as may be determined and/or enforced by a condition weighting schedule.

In one implementation, a strength score may be assigned to insights. For example, in one implementation, the strength score may be a positive continuous number. The strength score may, for example, signify an importance for a given statement based on specified criteria, such as financial impact, impact on other metrics, confidence, and/or the like. In one implementation, a strength score may be determined based on a "delta principle," identifying how much one or more related values or factors would have to change in order to negate the statement made in the given insight. For example, a determination may be made as to how much a topic, demographic, intent fraction, and/or the like would have to change in order to negate the statement. In one implementation, a conservative distance between confidence intervals of the fractions may be taken, again carrying on the same delta principle. Under this principle, in one implementation, the minimum may be taken at 0 and the maximum at 1 to identify the strength of a given statement.

In one implementation, a strength classification may be assigned (e.g., as a label, discrete score, Boolean, and/or the like) separately, in addition to, and/or based on the strength score. In one implementation, strength classification may take values such as, but not limited to, low strength, medium strength and high strength. In one implementation, assignment of statements to a strength classification may be made based on the comparison of a strength score to one or more threshold values. For example, in the delta principle example described above, a strength score in the range of 0-0.02 may be labeled as low strength, 0.02-0.08 as medium strength, and 0.08-1.00 as high strength. Different ranges and/or thresholds may be used based on the needs and/or desires of a particular implementation.

In one implementation, a tiering layer may assign the statements, insights, and/or the like to tiers based on factors such as relevance points, strength score and/or classification, diversity, confidence, and/or the like. In one implementation, an aggregate score may be determined based on one or more such factors, and tiering assignments made on the basis of that aggregate score, such as by comparing it to one or more tiering threshold values. In one implementation, insights intended for client presentation are assigned to a top tier. In one implementation, insights assigned to a second tier may be provided as suggestions and/or may be viewable by client services and may be reassigned, e.g., manually, to the top tier for client presentation. In one implementation, second tier insights may be available for client presentation such as based on user request, indication of insufficient top tier insights, and/or the like. In some implementations, insights may be further subdivided and/or assigned to further tiers based on insight handling and/or presentation purposes (e.g., some insights may be assigned to a tier 0 for presentation at the top of every insight presentation). In one implementation, within each tier the insights may be sorted, such as based on strength score, classification, and/or the like. Insight presentation may further include presentation of sorting criteria, strength scores, strength classifications, and/or the like. In some implementations, measures of relevance, strength, and/or the like may look at each insight in isolation, while tiering allows for cross-insight logic (e.g., diversity). In one implementation, insights may be sorted by relevance points to identify a plurality of relevance levels, and then sorted by a strength classification, until a top N (e.g., 5) insights can be identified.

In one implementation, diversity may be accounted for, such as limiting the number of insights of a given type to a certain threshold limit. Insights of a given type matching a top insight may be bumped down (e.g., in terms of relevance points, strength score, strength classification, and/or the like) until, e.g., a top N number of insights of other types can be identified. In one implementation, insights of a given type that are demoted based on a diversity condition may be flagged (e.g., "Demoted due to diversity) in association with an insight and/or insight scoring record, such as for client services presentation.

In one implementation, a curation and/or publication layer may determine what is displayed at a client system, client services system, reporting module, and/or the like. In one implementation, curation may act as a fail-safe mode, and may include one or more of the following operations: curator accepts top tier completely; curator manually and/or automatically rearranges insights across tiers (e.g., with non-generalizable reasons); curator manually and/or automatically rearranges insights across tiers (e.g., with a reason that is generalizable and could be fed back into the rules-based filtering and/or sorting described above).

In one implementation, the only metrics displayed to the client system are the insights, their ranks, and their classifications. In one implementation, drill-ins, tracking, and/or the like may be provided for presentation, such as upon request. For example, a drill-in may include information about one or more sources of an insight, confidence levels, additional metrics, related information, and/or the like. In one implementation, a chapter may be characterized as a tier (e.g., collection of insights) over a given period of time, and may be displayed with time resolution, tracked over time, and/or the like.

Aspects of an embodiment of an IDAP user interface are shown in FIGS. 12A-12I.

Topic Builder

In various embodiments, the IDAP may be configurable as a topic builder, permitting users to discovery topics, tags, labels, and/or the like to assign to documents in a corpus and/or to facilitate highly optimized queries over volumes of data. For example, the IDAP may act as a tool and/or process to allow one or more users to build optimized queries quantified, for example, by query precision and recall, such as for use in connection with future and/or updated collections of structured and/or unstructured data.

In some implementations, the IDAP may provide a supervised feedback loop which may be engaged by users to build ontologies (e.g., clusters of things, words, people, images, web pages, traits, behaviors, and/or the like) via interactions with structured and/or unstructured data. Optimized queries, topics, tags, labels, metadata, and/or the like constructed via topic builder embodiments of the IDAP may be employed in a variety of contexts, such as for sharing in multi-user environments, for using on an evolving document corpus, and/or the like. For example, in one embodiment, a document corpus may be drawn from a social media data feed, such as Twitter posts and/or the like, and updated in reatime, near real-time, periodically, on a triggered basis, and/or the like.

Figure 8:
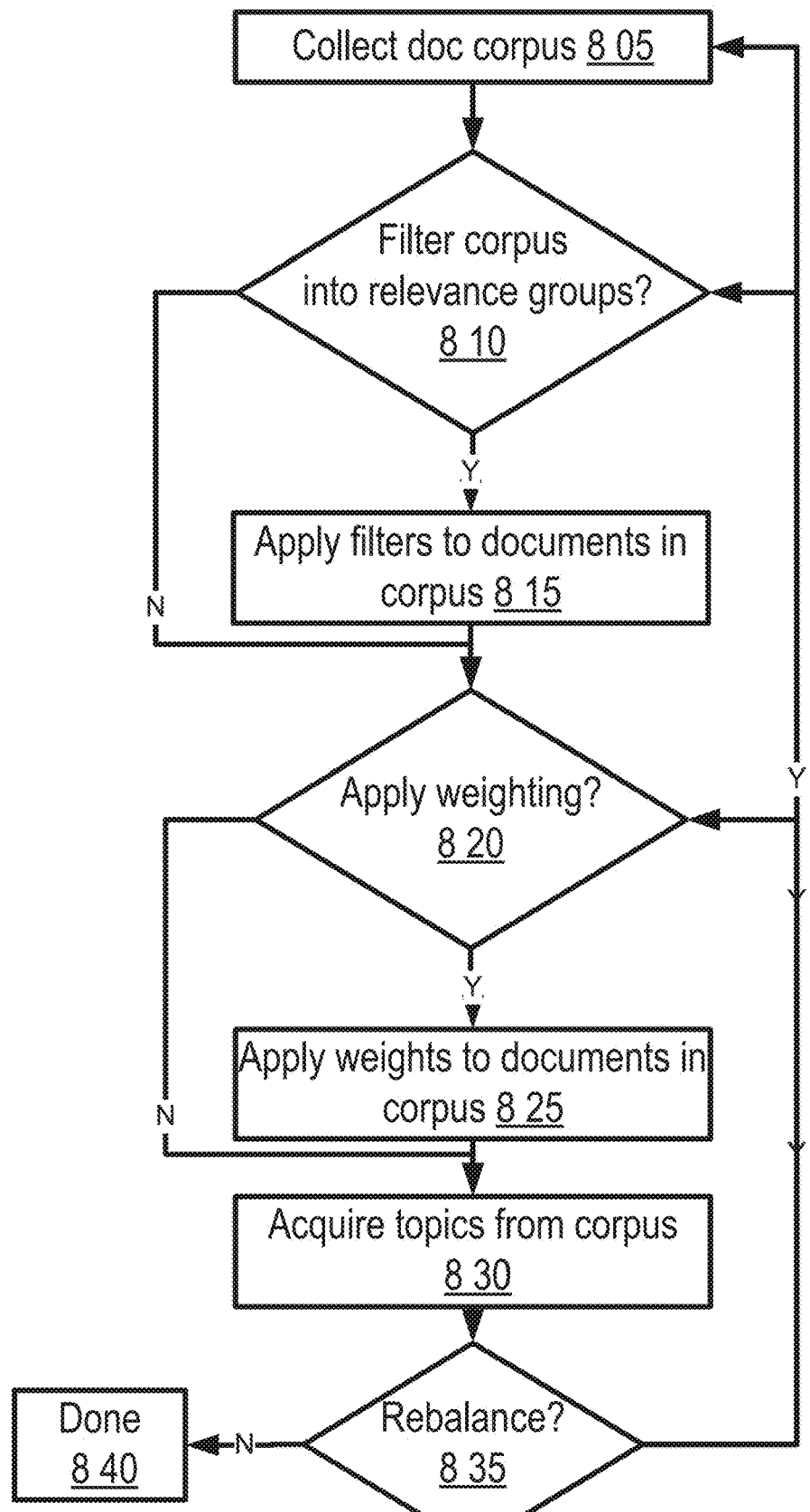
FIG. 8 shows aspects of exploration mode logic flow for a topic builder in one embodiment.

FIG. 8 shows aspects of exploration mode logic flow for a topic builder in one embodiment. A corpus of documents is collected 805, which may comprise a collection of structured and/or unstructured data such as social media feeds (e.g., text, audio, images, video, and/or the like documents, media, unstructured data and/or the like; and including sources such as Twitter, Facebook, Google+, Instagram, Snapchat, and/or the like). The document corpus may be updated, changed, supplemented, and/or the like over the course of a topic building process and/or after topic building, so as to apply optimized topics, queries, tags, labels, and/or the like to new data. A determination may be made as to whether one or more filters are to be applied to documents in the corpus 810. For example, documents may be filtered according to type, format, size, content, metadata, source, relevance criteria, and/or the like. If filtering is desired, one or more filters may be applied to sample and/or narrow the documents in the corpus 815. A determination may also be made as to whether weighting is to be applied to documents in the corpus 820, such that some documents factor more prominently than others in the determination of topics to follow. Any desired weighting may be applied 825. Topics are then acquired from the document corpus 830, where each topic comprises a query term in connection with related terms, identified via relationships (e.g., proximity, natural language relationship, parts-of-speech analysis, syntax analysis and/or other grammatical analysis, and/or the like) gleaned from documents in the corpus. Topics may be stored, such as in association with the corpus, specific documents, sources, anticipated uses, and/or the like. A determination may be made as to whether the document corpus should be rebalanced, updated, or otherwise modified 835 and, if so, then the flow may return to 805, 810 and/or 820 to collect new documents, apply filters, and/or weights. Otherwise, the flow may conclude 840 and/or proceed to evaluation mode, such as shown in one embodiment in FIG. 9

Figure 9:
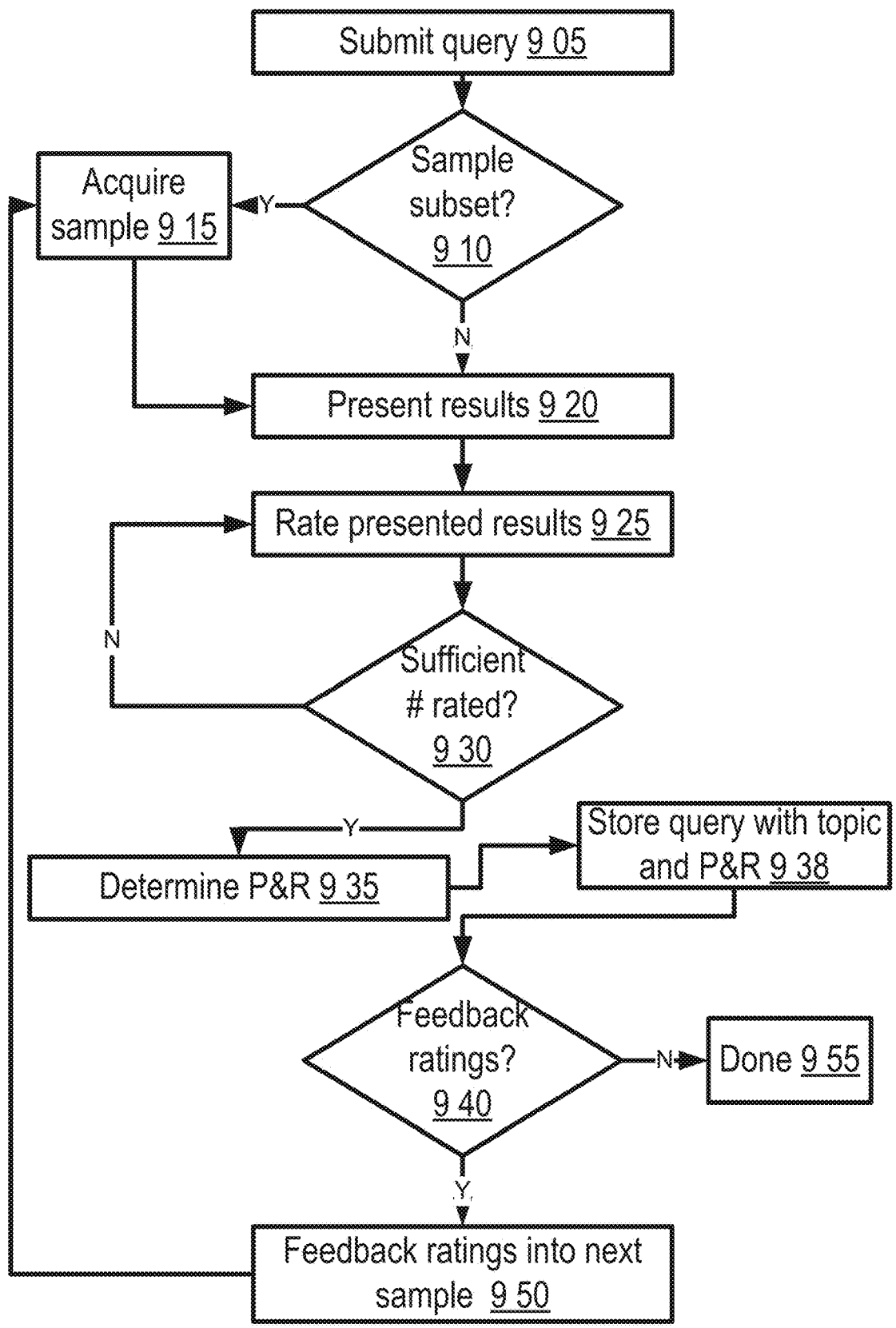
FIG. 9 shows aspects of evaluation mode logic flow for a topic builder in one embodiment.

FIG. 9 shows aspects of evaluation mode logic flow for a topic builder in one embodiment. In one embodiment, a topic builder evaluation mode may be employed to build topic sets where, in one implementation, each topic set may comprise a topic together with a collection of queries made from the topic and associated precision and recall values associated with each query. In one implementation, precision and/or positive prediction value may be quantified as a fraction of retrieved results relevant to a user's query. In one implementation, recall and/or sensitivity may be quantified as a fraction of relevant instances that are successfully retrieved in response to a query. Precision and recall (or "P & R") may be used to quantify the quality of queries, such as for query optimization. A user may submit a query in association with a topic over a document corpus and/or a subset thereof 905. A query may, for example, comprise a Boolean query over one or more terms, such as a query term and related terms associated with the query term as part of a topic. A query may, in some implementations, comprise a natural language query; a media-based query (e.g., image, audio, video, or other signal); and/or the like. A determination may be made regarding which documents to present 910, such as all matching query results and/or a sample and/or subset thereof, other results from the corpus and/or a subset and/or sample thereof, and/or the like. If a subset is desired, then the sample is acquired 915, such as may be based, for example, on document type, content, metadata, source, and/or the like. Query results may be presented for display to the user 920. In some implementations, displayed results may include results identified based on the submitted query and/or other results from the corpus not necessarily found as a result of the query. Inclusion of the latter may, for example, facilitate the determination of a recall metric, to identify a proportion of query-matching results in the document corpus that are not returned as a result of the query. The user may then rate presented results 925, such as according to precision and/or recall metrics. In one implementation, documents and/or other query results may be rated according to whether they match the query and/or desired results; don't match the query and/or desired results; can't determine whether they match the query and/or desired results; and/or the like. In some implementations, users may be permitted to enter a confidence interval and/or other fuzzy logic metrics, e.g., in order to quantify a degree of certainty regarding whether results match the query and/or desired results. In some implementations, weights may be applied to ratings, such as according to rating confidence intervals; corpus and/or query result volume; rater authority, experience, title, role, rank; and/or the like. A determination may be made as to whether a sufficient number of documents have been rated 930. For example, in one implementation, a fixed threshold number of documents must be rated before the flow proceeds to determining an overall precision and/or recall. In another implementation, a dynamic threshold number of documents may be determined and enforced, such as may be based on the number of matching query results and/or the sparseness of a query term across the document corpus. For example, in one implementation, a minimum number of rated results and/or documents may be determined according to a formula such as the following: Min=C/(# matching documents), where C is a constant (such as C=400). If at least a minimum number of documents has been rated, then a precision and/or recall may be determined for the query 935. For example, a precision may be determined as a ratio of the number of documents rated as matches to the total number of documents retrieved by the query. In another implementation, a precision may be determined as a ratio of a weighted number of matches, each weighted according to, e.g., a confidence metric, to the total number of retrieved results. In one implementation, a recall may be determined as a ratio of results retrieved in response to the query that are marked as matches to the total number of documents marked as matches. In another implementation, a recall may be determined as a ratio of a ratio of a weighted number of matches, each weighted according to, e.g., a confidence metric, to the total number of documents marked as matches. A topic set may be stored as an association between a topic, queries built from the topic, and precision and/or recall metric values determined for each query 938. A determination may be made as to whether to feedback ratings into a subsequent sampling of documents from the corpus in response to a query submission 940. For example, documents rated as non-matches in response to a particular query may be excluded from query results for a subsequent query submission. In another example, documents not retrieved in response to a particular query that are nevertheless marked as matching the query may be included as results in response to subsequent submissions of that query. If desired, ratings are fed back into subsequent sampling of documents 950 and/or may influence subsequent uses of the corresponding query terms. If no feedback is desired, then the flow may conclude 955.

Influence Discovery

In some embodiments, the IDAP may be configurable for influence discovery across social media and/or other structured and/or unstructured document sources. For example, the IDAP may be configured to identify subsets of social media users responsible for driving one or more global metrics (e.g., sales, subscriptions, and/or the like) from unstructured data, e.g., without requiring exemplars, templates, and/or the like for such users in advance. In one embodiment, users may be identified by identifying associated user-generated data whose behavior is correlated with one or more global metrics of interest.

Figure 10:
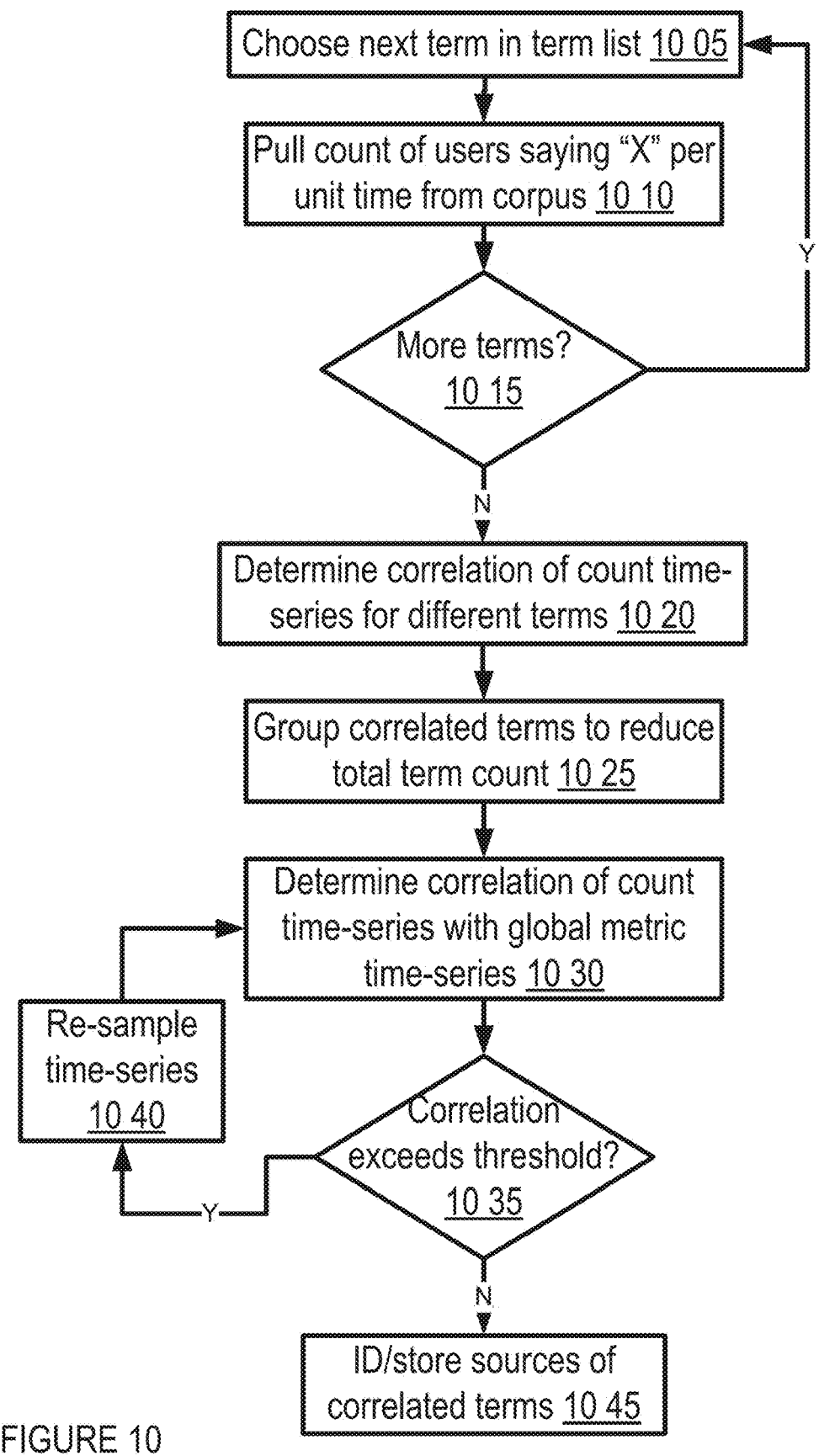
FIG. 10 shows aspects of logic flow for social media influence discovery in one embodiment.

FIG. 10 shows aspects of logic flow for social media influence discovery in one embodiment. A term may be pulled from a list of terms 1005, and may in various implementations, comprise a word, phrase, image, sound, action, behavior, and/or the like. A count of instances of the number of uses and/or users employing that term may be determined per unit time (e.g., per day, week, month, quarter, year, and/or the like) 1010, to yield a count time-series for that term. In one implementation, where the number of observations of term usage are limited in a given period, a logistic regression may be performed to fill in missing information and/or estimate a count value for a given period. A determination may be made as to whether count time-series are to be determined for other terms 1015 and, if so, the flow may return to 1005 to choose the next term in the list. In one implementation, a correlation of count time-series for different terms may be determined 1020, and terms having a sufficient degree of correlation may be grouped 1025, such as in order to reduce the total term count. In one implementation, the correlation of count time-series for different terms may be determined as a Pearson correlation. In another implementation, the correlation of count time-series for different terms may be determined as a Pearson correlation with Sobolev Extension.

A global metric time-series may then be accessed and compared with one or more term and/or term group count time-series to determine correlations 1030. In one implementation, the correlation of count time-series with global metric time-series may be determined as a Pearson correlation. In another implementation, the correlation of count time-series with global metric time-series may be determined as a Pearson correlation with Sobolev Extension. A wide variety of different global metrics may be considered based on the needs and/or desires of a particular user and/or use scenario. For example, global metrics may include sales, revenues, profits, subscriptions, service usages, votes, social media activities, and/or the like. Thus, for example, a global metric time-series could comprise revenue per quarter, sales per month, Facebook updates per day, votes per election cycle period, and/or the like. Correlations determined at 1030 may be compared to a threshold to identify terms whose count time-series are highly correlated with the global metric time-series 1035. In one implementation, a correlation threshold may be a fixed amount. In another implementation, a correlation threshold may be determined dynamically, such as based on a correlation determined between a global metric time-series and a term count time-series drawn from random samples of the document corpus. In one implementation, where the correlation does not exceed the threshold at 1035, the correlation calculation at 1030 may be repeated with re-sampled time-series 1040, such as by dropping random dates and/or periods in order to eliminate the impact of a small group of spurious deviations. Most highly correlated terms (e.g., top 10-15 of them from an original list of 5,000-10,000) may be identified, e.g., as intent drivers, and/or stored 1045. In some implementations, users employing highly correlated terms historically and/or on a forward-looking basis may be identified (e.g., as "influencers" or "super users") and/or monitored for term usage and/or other activity which may impact global metric values. For example, usage of identified terms by influencers may be detected in order to predict expected behaviors of global metric, as determined previously from historical correlations. In another implementation, individual user behaviors and/or term usages may be predicted from monitoring and/or detection of global metric behaviors and/or patterns.

In some implementations, a multi-metric analysis may be employed, wherein time-series for two or more global metrics are evaluated in a multi-dimensional correlation with term count time-series. In some implementations, users may be identified as "influencers" or "super users" based on other criteria (e.g., experience, rank, role, title, activity levels, number of social media accounts, number of social media connections, and/or the like) in conjunction with usage of terms highly correlated with global metrics. In some implementations, time-series correlations may be calculated as weighted sums and/or integrals over two time variables. For example, in one implementation, a correlation may be determined according to a formula similar to the following example:

$$correlation = \iint \delta(t_1 - t_2) x(t_1) y(t_2) dt_1 dt_2$$

Where, in the example above, x and y are count time-series and/or global metric time-series over time variables $t_1$ and $t_2$, and $\delta$ is a weighting factor which takes into account correlations of events occurring at different times. In some implementations, specific frequency components of count and/or global metric time-series may be isolated, e.g., via Fourier analysis, in order to determine correlation of those frequency components in isolation. Thus, for example, correlations of fast or slowly varying term usage and/or global metric behavior may be determined separately. In some implementations, series over one or more independent variables other than and/or in addition to time may be employed (e.g., geography) to identify correlations between term usage and one or more global metrics.

FIGS. 11A-11D show a table of primals and related insights in one embodiment. A primals column 1101 lists various combinations of primals, such as topic (T), time (t), demographic (D), competitor brand (C), and/or the like. Thus, for example, a "T t" combination may signify insights related to a particular topic tracked over a period of time, while "T C" combination may signify insights related to a particular topic in comparison to performance of a competitor brand. A wide variety of other primals and/or combinations thereof may be employed in other implementations of IDAP operation. A "Statement in English" column 1105 lists insight descriptions and/or examples of how an insight may be presented, e.g., to a client system, client services system, reporting module, backend database, and/or the like. For example. for a "T t" primal combination, the statement in English may reflect that the topic T increased in importance for driving customers to a target brand and/or in driving one or more other key performance indicators (KPIs). An "Examples" column 1110 provides some examples of the insight in specific instances. A "Time Based Footnote" 1115 indicates one or more times and/or time periods over which a particular insight may be determined. For example, in an insight having primal t may be computed at a current time and/or time interval in comparison to a prior time and/or time interval, while an insight not having primal t may be computed over a single baseline period. A "Computation" column 1120 may evaluate intent (I), such as consumer intent, in relation to primals associated with a given insight in accordance with formulas and/or conditions similar to the displayed examples. A "Display Metrics" column 1125 includes one or more additional metrics related to the insight and/or its associated primals which may also be displayed in addition to and/or instead of the insight statement. A "Qualifiers" column 1130 includes examples of qualifiers which may be included in an insight in association with one or more primals, such as "increasing," "decreasing," and "neutral" to describe time-based variations in an insight parameter. A "Visual Representation" column 1135 includes a listing of display characteristics, user interface features, and/or the like for display by a client system, client services system, reporting module, and/or the like in association with an insight and/or insight primals. Finally, a "Comments" column 1140 includes additional remarks about each of the indicated insights and/or associated primals for the illustrated embodiment.

Figure 12A:
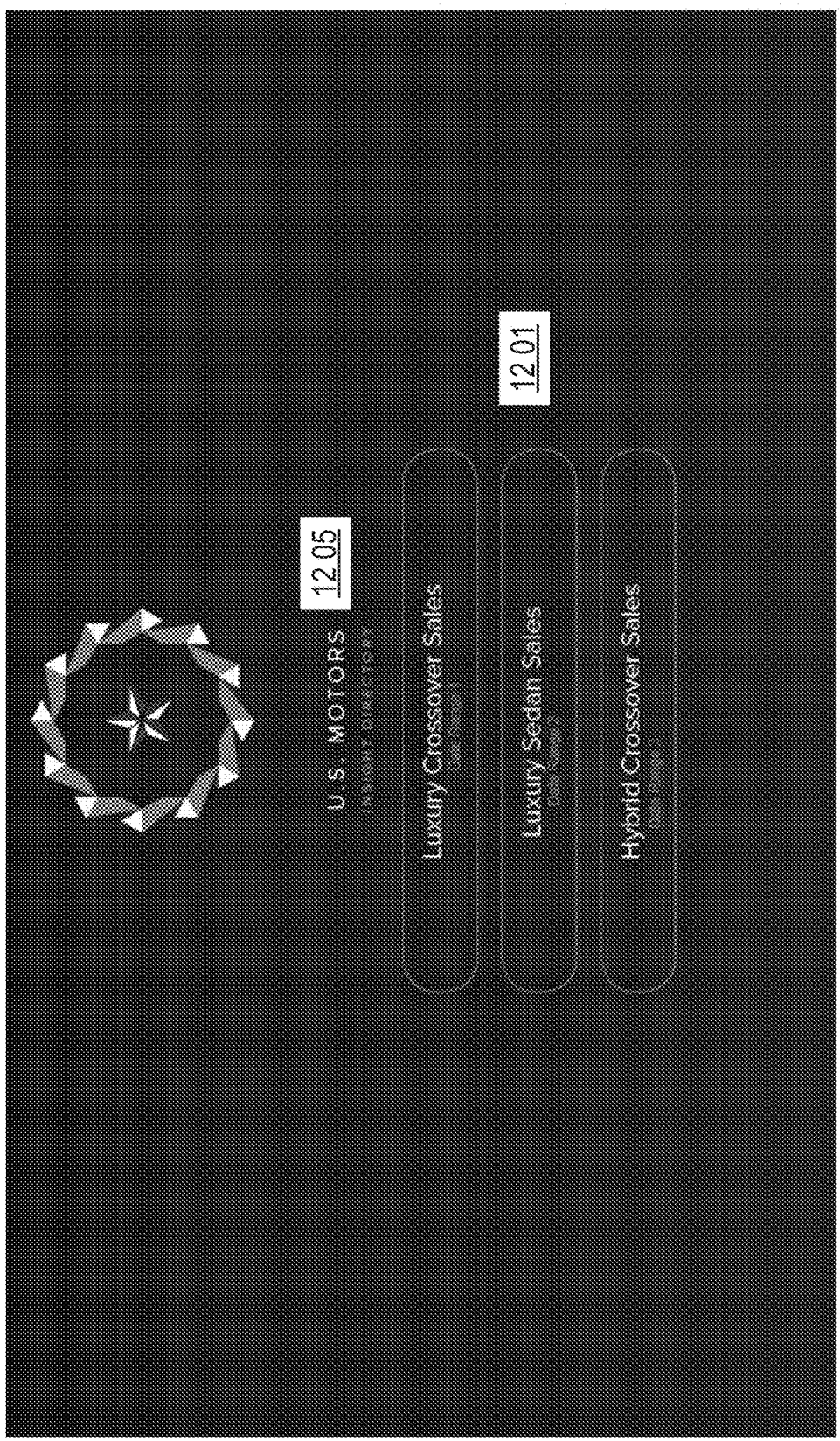
FIGS. 12A-12I show aspects of user interface in embodiments of IDAP operation.
Figure 12B:
Figure 12C:
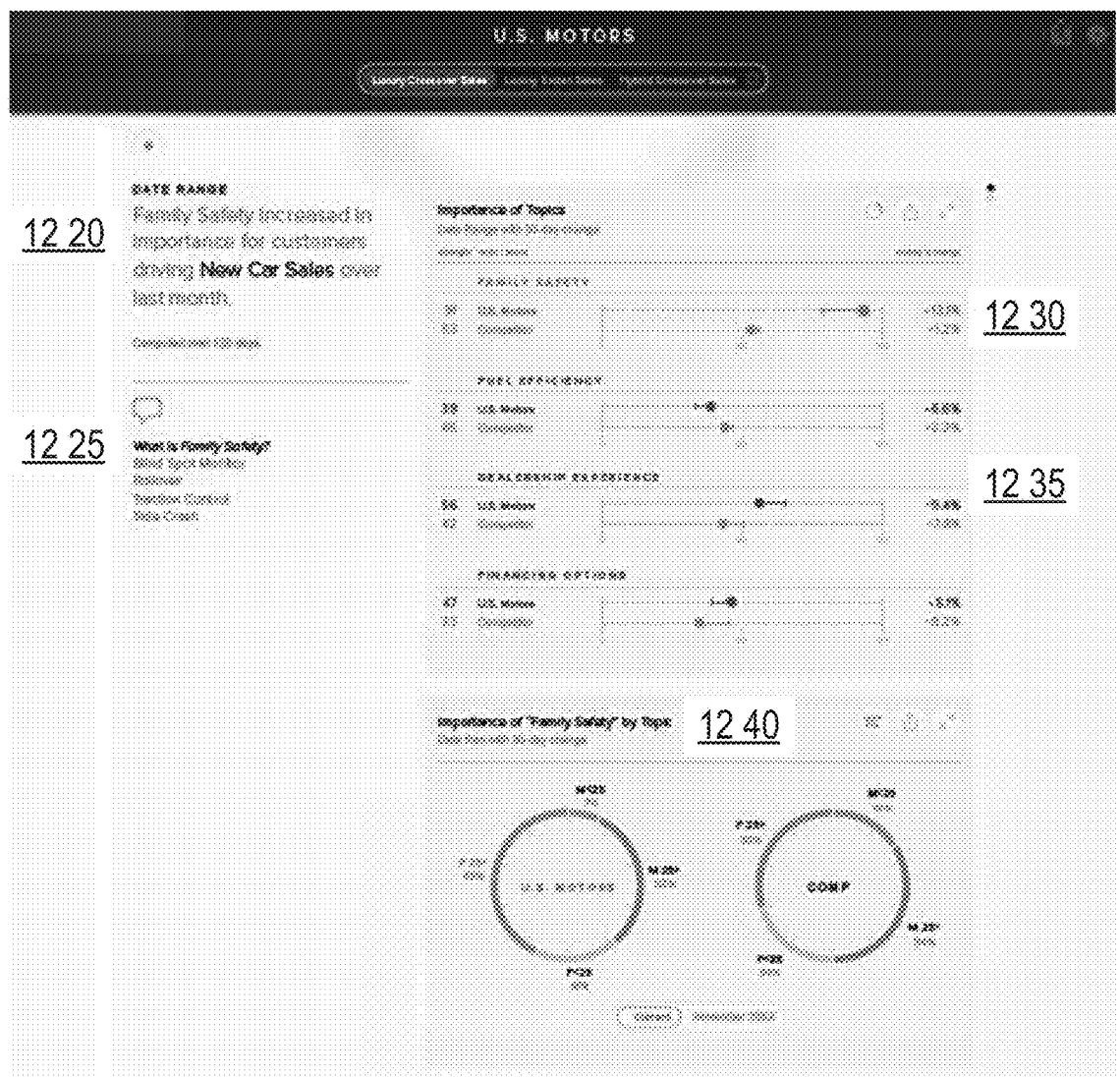
Figure 12D:
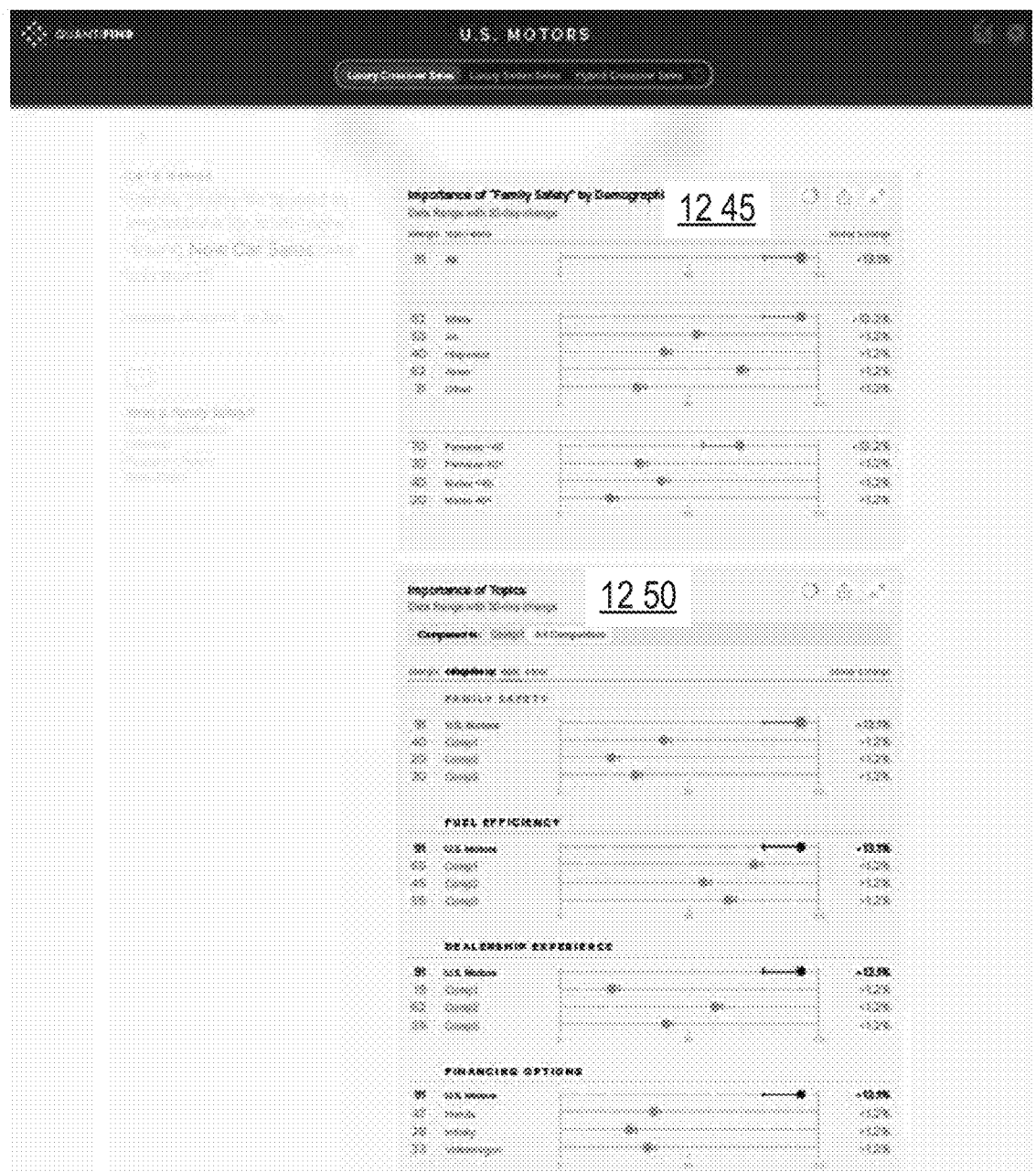
Figure 12E:
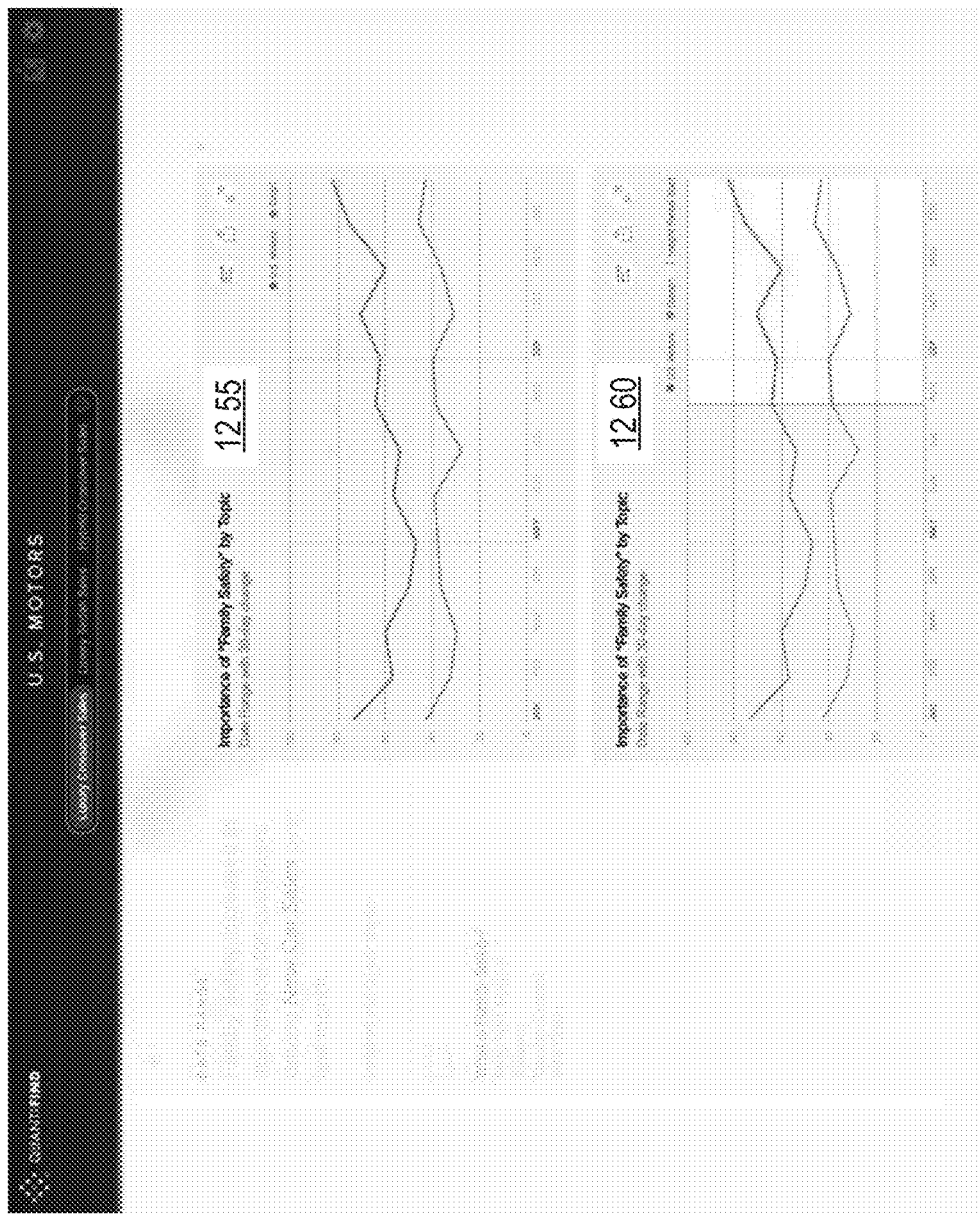
Figure 12F:
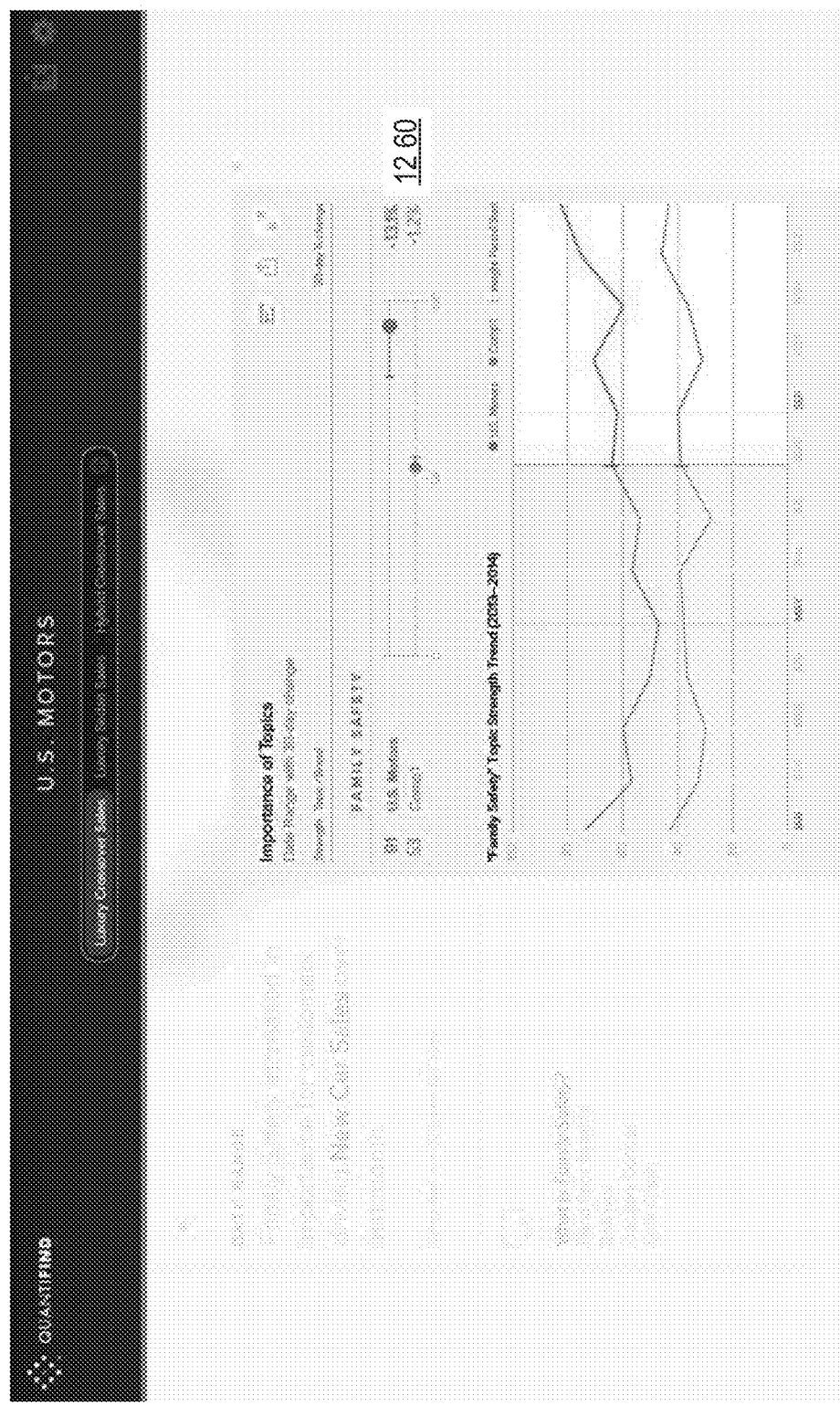
Figure 12G:
Figure 12G:
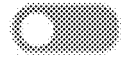
Figure 12G:
Figure 12G:

FIGS. 12A-12I show aspects of user interface in embodiments of IDAP operation. FIG. 12A shows an example of an insight directory screen, displaying selectable insight categories 1201 for a given brand "U.S. Motors" 1205. In one implementation, the displayed insight categories may be previously set up by the user, client system, IDAP administrator, client services system, and/or the like, and may be subsequently retrievable, such as to view updates or other changes. In another implementation, a client system may automatically generate and display insight categories, such as by selecting top insights (e.g., according to relevance points, strength score and/or classification, and/or the like) for display and grouping them into categories in an insight directory interface. FIG. 12B shows an example of an insight screen, where a user has selected a particular insight from options such as those shown in FIG. 12A. In this case, the user has selected the "Luxury Crossover Sales" insight, and the interface may include one or more elements 1210 to allow selection of one or more other insights directly without returning to a prior screen. The screen also may include a selectable date range for the insight 1215, allowing the user to select, for example, a current date, a tracked prior date, date range, and/or the like. The screen may also list one or more insights 1220 related to the selected insight category. In one implementation, displayed insights 1220 may be selectable, allowing a user to drill down into further information related to the insight, such as by clicking on the insight. FIG. 12C shows an example of a drill-down screen for a selected insight, in this case the insight, "Family Safety increased in importance for customers driving New Car Sales over last month" 1220, based on the topic "Family Safety" in this instance. The screen may include a further description of insight parameters 1225, such as the topic. The screen may further include further information about the insight, such as a collection of importance ratings for the specific topic in the insight (family safety) 1230 and/or for related topics (e.g., fuel efficiency, dealership experience, financing options, and/or the like) 1235. In the displayed implementation, the screen may show the relative importance of each topic to the insight (e.g., how much each topic drives new sales over a given time period) for the target brand in comparison to one or more competitor brands, across different products, in different regions, and/or the like. In one implementation, the relative importance may also be displayed with an error bar reflecting statistical features (e.g., confidence, variance, standard deviation, and/or the like) of a particular importance value. The screen may further provide a demographic breakdown of the importance of one or more topics for the target brand and/or one or more competitor brands 1240. FIG. 12D shows an example of a screen showing further insight drill-down information, such as an alternate display of a demographic breakdown of topic importance 1245 and a comparison of topic importance across a plurality of competitors 1250. Such a display may, for example, allow a user to identify which demographic groups and/or competitor brands are most impacted, in terms of product sales, by a given topic (e.g., sales of Competitor 1's product are mostly driven by fuel efficiency considerations; females under 40 are most concerned about family safety in purchasing the target brand's product). FIG. 12E shows an example of a screen showing graphical breakdown of insight information, including importance of an insight topic over time for a target brand and competitor brand 1255. In one implementation, the graphical representation may be selectable 1260, allowing a user to identify a specific time at which the topic importance is to be evaluated and/or displayed. FIG. 12F shows an example of a screen that may appear in response to a selection of a specific time at 1260 in FIG. 12E, where the topic importance for the target brand and competitor at the selected time are displayed 1260. FIG.

Figure 12H:
Figure 12H:
Figure 12I:
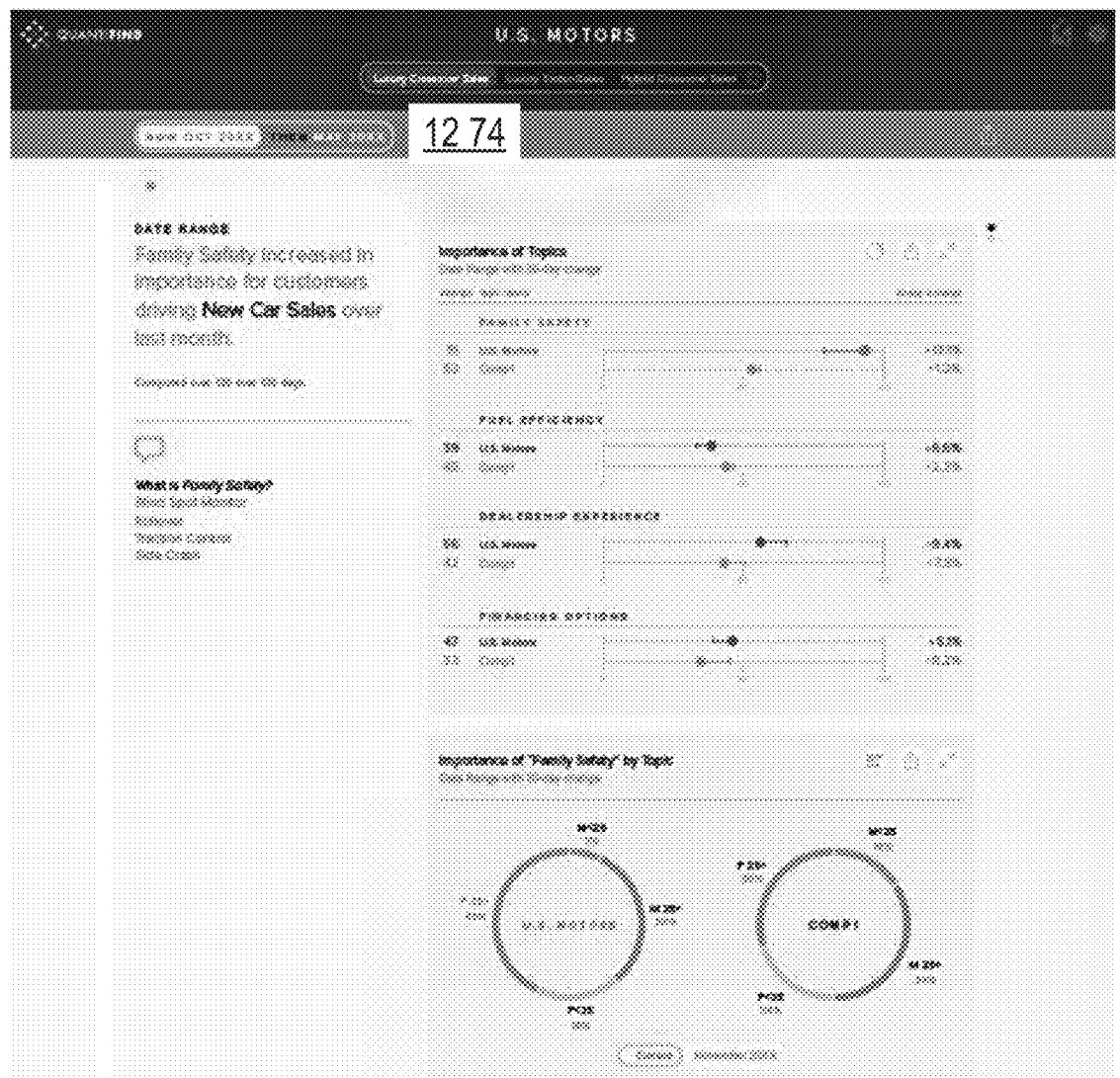

12G shows an example of a screen for insight sharing. The screen may include a variety of interface elements facilitating the sharing of insights, such as with other IDAP users, non-users, and/or the like. A file format element 1265 may allow a user to define reporting parameters and/or display characteristics, such as the size, orientation, aspect ratio, and/or the like. A type element 1267 may allow a user to further define a filetype (e.g., PDF, JPG, and/or the like) for the shared insight. Additional elements 1269 may be provided to allow for further customization of the shared insight, such as including a cover page, glossary (e.g., providing information similar to that shown at 1225 in FIG. 12C), report configuration parameters, and/or the like. The screen may also include one or more selectable options for how the insight should be shared 1271, such as an option to download the insight, email the insight, and/or the like. FIG. 12H shows an example of a screen for sharing an insight by email, with auto-population of an email with the insight 1272. In some implementations, the IDAP may include email attachments as well, such as the insight, related insights, glossary, cover page, reporting configuration, and/or the like. FIG. 12I shows an example of a screen similar to the drill-down screen of FIG. 12C, except including a further interface element 1274 facilitating changing of a time for insight evaluation.

In some implementations, the IDAP may be configurable to discover signals from among a wide variety of media sources, such as but not limited to social media, social comments, third party financial data, and/or the like, that drive sales or other aspects of business and/or marketing strategy. Intentful conversations extracted from such sources may be identified and correlated to one or more KPIs. In one implementation, analysis of large volumes (e.g., multi-terabyte) annotated data sets containing billions of social comments and millions of users over thousands of different dimensions may be performed to build models and compute counts. The IDAP may, for example, employ text searching, natural language processing tools, and/or the like, as well as flexible time series analysis, random sampling, top K analysis, and/or the like.

Media Efficacy

In some embodiments, the IDAP may be configurable to evaluate efficacy and/or return on investment of advertising and/or other media campaigns and/or to recommend actions for improvement thereof. For example, in one implementation the IDAP may employ influence discovery tools such as those described above and in relation to FIG. 6 in order to identify actions, activities, terms, phrases, images, company behaviors, spending patterns, and/or the like that are highly correlated with global metric behaviors and/or patterns. In some implementations, multi-faceted campaigns of media and/or advertising behavior (e.g., including one or more of: internet advertising, television advertising, radio advertising, print advertising, social media publication, product placement, and/or the like) may be considered as a whole in relation to global metric behaviors and/or patterns in order to evaluate the efficacy and/or return on investment associated with the campaign as a whole.

In one implementation, a particular test corpus may be compared against a broader control corpus for identification of trends with respect to one or more global metrics. For example, an advertiser may focus on a test group comprising watchers of a particular television program and compare this with a control group comprising watchers of television in general. Correlations of test group activities, documents, data, and/or the like with the global metric may then be compared with correlations for the same information of the control group in order to determine the relative efficacy of focusing advertisements on the test group. In another implementation, a test group and control group may comprise the same group at different times.

In another implementation, return on investment may be determined for sponsorship campaigns, e.g., involving sports, teams, celebrities, and/or the like. For example, celebrity followers in social data may be monitored to identify changes in the usage of global metric correlated intent drivers before and after a campaign. In one implementation, a control group may be comprised of general users, not necessarily celebrity followers, who are also using the same intent drivers, in order to determine the relative efficacy of the sponsorship campaign with respect to the particular celebrity.

In one implementation, various factors which may influence the volume of intent drivers in social data may be accounted for in order to not unduly influence results. For example, account may be taken of factors such as, but not limited to: scaling of the number of social media users over time, geography, from one social media service to another, and/or the like; census and/or other demographic variations over time, geography, and/or the like; seasonal variations in social media usage (e.g., associated with the release of a new mobile device, weather, and/or the like).

IDAP Controller

Figure 13:
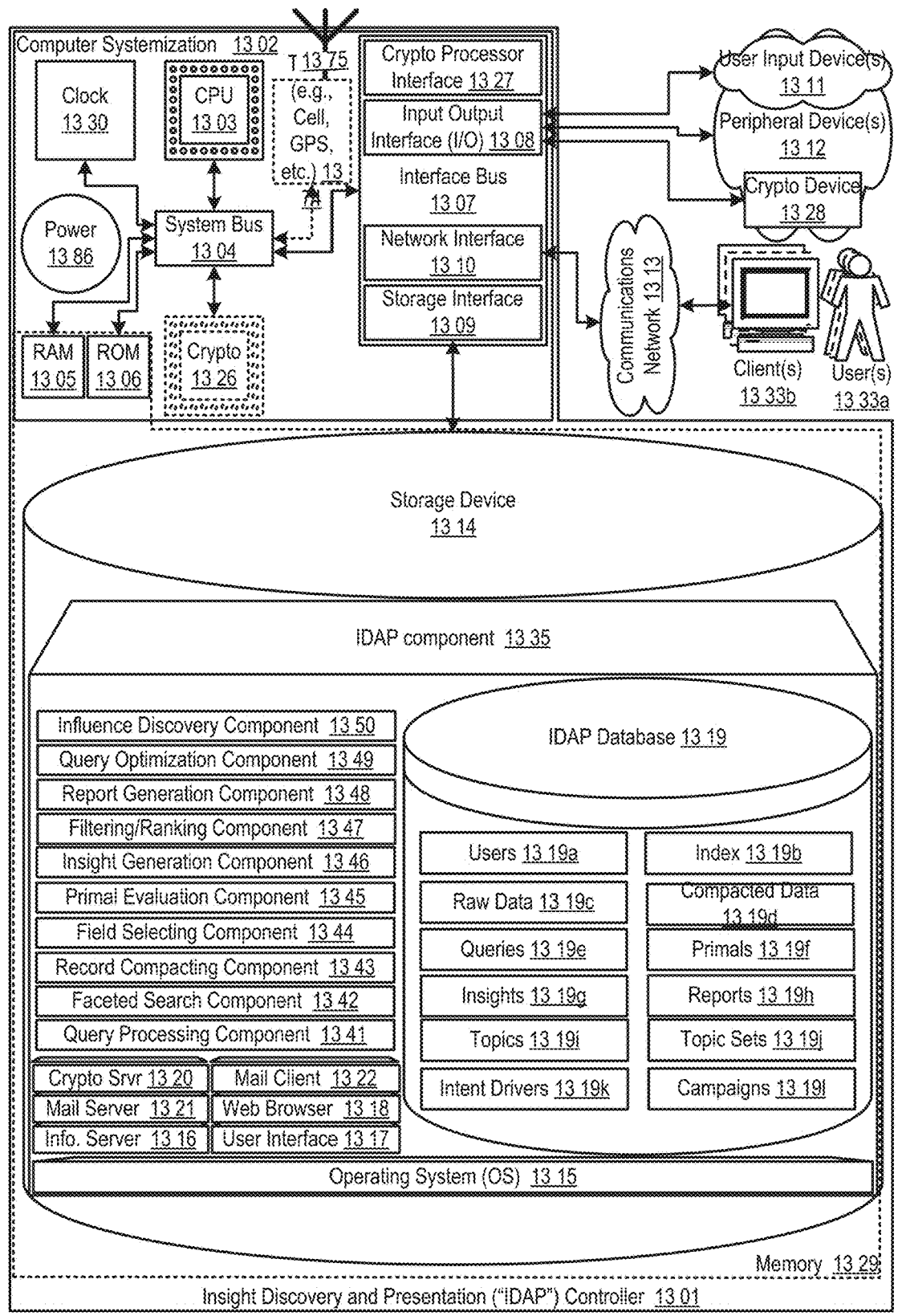
FIG. 13 shows a block diagram illustrating embodiments of a IDAP controller.

FIG. 13 shows a block diagram illustrating embodiments of a IDAP controller. In this embodiment, the IDAP controller 1301 may serve to aggregate, process, store, search, serve, identify, instruct, generate, match, and/or facilitate interactions with a computer through market analysis technologies, and/or other related data.

Typically, users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program.

These information technology systems provide interfaces that allow users to access and operate various system components.

In one embodiment, the IDAP controller 1301 may be connected to and/or communicate with entities such as, but not limited to: one or more users from user input devices 1311; peripheral devices 1312; an optional cryptographic processor device 1328; and/or a communications network 1313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The IDAP controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effectuate communications, operations, storage, etc. The computer systemization may be connected to a power source 1386; e.g., optionally the power source may be internal. Optionally, a cryptographic processor 1326 and/or transceivers (e.g., ICs) 1374 may be connected to the system bus. In another embodiment, the cryptographic processor and/or transceivers may be connected as either internal and/or external peripheral devices 1312 via the interface bus I/O. In turn, the transceivers may be connected to antenna(s) 1375, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing IDAP controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1329 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the IDAP controller and beyond through various interfaces. Should processing requirements dictate a greater amount speed and/or capacity, distributed processors (e.g., Distributed IDAP), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the IDAP may be achieved by implementing a microcontroller such as CAST's R8051XC2 microcontroller; Intel's MCS 51 (i.e., 8051 microcontroller); and/or the like. Also, to implement certain features of the IDAP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the IDAP component collection (distributed or otherwise) and/or features may be implemented via the microprocessor and/or via embedded components; e.g., via ASIC, coprocessor, DSP, FPGA, and/or the like. Alternately, some implementations of the IDAP may be implemented with embedded components that are configured and used to achieve a variety of features or signal processing.

Depending on the particular implementation, the embedded components may include software solutions, hardware solutions, and/or some combination of both hardware/software solutions. For example, IDAP features discussed herein may be achieved through implementing FPGAs, which are a semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the IDAP features. A hierarchy of programmable interconnects allow logic blocks to be interconnected as needed by the IDAP system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the IDAP may be developed on regular FPGAs and then migrated into a fixed version that more resembles ASIC implementations. Alternate or coordinating implementations may migrate IDAP controller features to a final ASIC instead of or in addition to FPGAs. Depending on the implementation all of the aforementioned embedded components and microprocessors may be considered the "CPU" and/or "processor" for the IDAP.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the IDAP thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(ses) 1307 may accept, connect, and/or communicate to a number of interface adapters, conventionally although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/or connect to a communications network 1313. Through a communications network 1313, the IDAP controller is accessible through remote clients 1333b (e.g., computers with web browsers) by users 1333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed IDAP), architectures may similarly be employed to pool, load balance, and/or otherwise increase the communicative bandwidth required by the IDAP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1311 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1312 may be connected and/or communicate to I/O and/or other facilities of the like such as network interfaces, storage interfaces, directly to the interface bus, system bus, the CPU, and/or the like. Peripheral devices may be external, internal and/or part of the IDAP controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the IDAP controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the IDAP controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the IDAP controller and/or a computer systemization may employ various forms of memory 1329. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1329 will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the IDAP component(s) 1335; and/or the like (i.e., collectively a component collection). These components may be stored and accessed from the storage devices and/or from storage devices accessible through an interface bus. Although non-conventional program components such as those in the component collection, typically, are stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the IDAP controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX;

Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the IDAP controller to communicate with other entities through a communications network 1313. Various communication protocols may be used by the IDAP controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the IDAP controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the IDAP database 1319, operating systems, other program components, user interfaces, Web browsers, and/or the like.

Access to the IDAP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the IDAP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the IDAP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the IDAP enabled nodes. The combined application may be nugatory on systems employing standard Web browsers.

Mail Server

A mail server component 1321 is a stored program component that is executed by a CPU 1303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the IDAP.

Access to the IDAP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the IDAP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the IDAP component to engage in secure transactions if so desired. The cryptographic component facilitates the secure accessing of resources on the IDAP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The IDAP Database

The IDAP database component 1319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the IDAP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the IDAP database is implemented as a data-structure, the use of the IDAP database 1319 may be integrated into another component such as the IDAP component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several tables 1319a-l. A Users table 1319a may include fields such as, but not limited to: user_ID, name, login, password, contact_info, query-history, settings, preferences, primal_ID(s), insight_ID(s), report_ID(s), and/or the like. The user table may support and/or track multiple entity accounts on a IDAP. An Index table 1319b may include fields such as, but not limited to: index_ID, index_type, data_feed_ID(s), industry_ID(s), term(s), data_type(s), data_type_value(s), snippet(s), source(s), author(s), date(s), and/or the like. A Raw Data table 1319c may include fields such as, but not limited to: raw_data_ID, data_feed_ID(s), index_ID(s), compacted_data_ID(s), raw_data_type, raw_data_content, fields, raw_data_parameters, and/or the like. A Compacted Data table 1319d may include fields such as, but not limited to: compacted_data_ID, data_feed_ID(s), index_ID(s), raw_data (ID), raw_data_type, compacted_data_content, fields, compacted_data_parameters, and/or the like. In one implementation, the data feed may be populated by a social media data feed (e.g., Facebook status updates, Twitter feed, and/or the like), by a market data feed (e.g., Bloomberg's PhatPipe, Dun & Bradstreet, Reuter'sTib, Triarch, etc.), and/or the like, such as, for example, through Microsoft's Active Template Library and Dealing Object Technology's real-time toolkit Rtt.Multi. A Queries table 1319e may include fields such as, but not limited to: query ID, query_type, query_configuration, query_content, fields, precision, recall, user_ID(s), raw_data_ID(s), compacted_data_ID(s), and/or the like. A Primals table 1319f may include fields such as, but not limited to: primal_ID, topic, demographic, time, brand, nationality, group_association, primal_data_value, and/or the like. An Insights table 1319g may include fields such as, but not limited to: insight_ID, primal_ID(s), user_ID(s), insight_template, insight_natural_language_template, filters, ranking, tiering, thresholds, and/or the like. A Reports table 1319h may include fields such as, but not limited to: report_ID, report_name, user_ID(s), primal_ID(s), insight_ID(s), report_template, topic_ID(s), topic_set ID(s), intent_driver_ID(s), campaign_ID(s), and/or the like. A Topics table 1319i may include fields such as, but not limited to: topic_ID, query_term, related_term(s), query_ID(s), primal_ID(s), user_ID(s), and/or the like. A Topic Sets table 1319j may include fields such as, but not limited to: topic_set_ID, topic_ID(s), query_ID(s), queries, precision, recall, user_ID(s), and/or the like. An Intent Drivers table 1319k may include fields such as, but not limited to: intent_driver_ID, term, phrase, image, sound, action, behavior, pattern, time, global_metric(s), correlation(s), primal_ID(s), user_ID(s), insight_ID(s) and/or the like. A Campaigns table 1319l may include fields such as, but not limited to: campaign_ID, intent_driver_ID(s), efficacy, return_on_investment, test_group(s), control_group(s), user_ID(s), and/or the like.

In one embodiment, the IDAP database may interact with other database systems. For example, employing a distributed database system, queries and data access by search IDAP component may treat the combination of the IDAP database, an integrated data security layer database as a single database entity.

In one embodiment, user programs may contain various user interface primitives, which may serve to update the IDAP. Also, various accounts may require custom database tables depending upon the environments and the types of clients the IDAP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319a-l. The IDAP may be configured to keep track of various settings, inputs, and parameters via database controllers.

The IDAP database may communicate to and/or with other components in a component collection, including itself, and/or facilities of the like. Most frequently, the IDAP database communicates with the IDAP component, other program components, and/or the like. The database may contain, retain, and provide information regarding other nodes and data.

The IDAPs

The IDAP component 1335 is a stored program component that is executed by a CPU. In one embodiment, the IDAP component incorporates any and/or all combinations of the aspects of the IDAP that was discussed in the previous figures. As such, the IDAP affects accessing, obtaining and the provision of information, services, transactions, and/or the like across various communications networks. The features and embodiments of the IDAP discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the IDAP's features and facilities, and in many cases reduce the costs, energy consumption/requirements, and extend the life of IDAP's underlying infrastructure; this has the added benefit of making the IDAP more reliable. Similarly, many of the features and mechanisms are designed to be easier for users to use and access, thereby broadening the audience that may enjoy/employ and exploit the feature sets of the IDAP; such ease of use also helps to increase the reliability of the IDAP. In addition, the feature sets include heightened security as noted via the Cryptographic components 1320, 1326, 1328 and throughout, making access to the features and data more reliable and secure The IDAP transforms raw data, query, and, UI interaction inputs via IDAP Query Processing 1341, Faceted Search 1342, Record Compacting 1343, and Field Selecting 1344, Primal Evaluation 1345, Insight Generation 1346, Filtering/Ranking 1347, Report Generation Query Optimization 1349, and Influence Discovery 1350 components into query result outputs, topics, topic sets, intent drivers, campaign efficacy metrics, and/or the like.

The IDAP component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the IDAP server employs a cryptographic server to encrypt and decrypt communications. The IDAP component may communicate to and/or with other components in a component collection, including itself, and/or facilities of the like. Most frequently, the IDAP component communicates with the IDAP database, operating systems, other program components, and/or the like. The IDAP may contain, communicate, generate, obtain, and/or provide program component, system, user, and/or data communications, requests, and/or responses.

Distributed IDAPs

The structure and/or operation of any of the IDAP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the IDAP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the IDAP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
        $input = "";
        $input = socket_read($client, 1024);
        $data .= $input;
} while($input != "");
// parse data to extract variables
$obj = json_decode($data, true);
// store input data in a database
```

-continued

```
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2rl/index.jsp?topic=/com.ibm.IBMDI.doc/referenceguide295.htm and other parser implementations:

http://publib.boulder.ibm.com/infocenter/tivihelp/v2rl/index.jsp?topic=/com.ibm.IBMDI.doc/referenceguide259.htm all of which are hereby expressly incorporated by reference.

In order to address various issues and advance the art, the entirety of this application for APPARATUSES, METHODS AND SYSTEMS FOR INSIGHT DISCOVERY AND PRESENTATION FROM STRUCTURED AND UNSTRUCTURED DATA (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. A processor-implemented method, comprising: identifying primal data variables, including at least topic, demographic and brand; determining primal data variable trends over time;
   generating a plurality of insight records based on a relationship within a corpus of documents between the primal data variable trends for at least two primal data variables; filtering the insight records according to pre-filtering criteria; sorting the insight records according to ranking criteria;
   identifying at least one insight natural language presentation template associated in memory with at least one of the plurality of insight records, the at least one insight natural language presentation template configured to generate a natural language report comprising the relationship between the primal data variable trends for the at least two primal data variables;
   populating the at least one natural language presentation template with the at least two primal data variables and the primal data variable trends to yield the natural language report; and
   providing the natural language report for display.

2. The method of claim 1, wherein the primal data variables are identified from packed records stored in one or more worker nodes in a distributed storage environment.

3. The method of claim 2, wherein the distributed storage environment comprises an akka cluster.

4. The method of claim 1, wherein the corpus of documents comprises at least one social media data feed.

5. The method of claim 1, wherein determining primal data variable trends over time further comprises determining a change in correlation between at the least two primal data variables between two points in time.

6. The method of claim 1, wherein filtering the insight records according to pre-filtering criteria comprises applying at least one blacklist filter.

7. The method of claim 1, wherein filtering the insight records according to pre-filtering criteria comprises applying at least one colinearity filter.

8. The method of claim 1, wherein filtering the insight records according to pre-filtering criteria comprises applying at least one confidence filter.

9. The method of claim 1, wherein sorting the insight records according to ranking criteria further comprises:
   determining an insight rating score based on the ranking criteria for each of the plurality of insight records;
   comparing the insight rating score to at least one tiering threshold for each of the plurality of insight records; and
   associating each of the plurality of insight records with a tier based on the comparing.

10. The method of claim 1, wherein the ranking criteria includes at least one of a degree of change of a primal value relationship, a direction of change of a primal value relationship, an insight actionability, and an expected return-on-investment.

11. The method of claim 1, wherein the natural language report is persisted in at least one data record associated with at least one of the plurality of insight records.

12. The method of claim 1, wherein the natural language report is persisted in at least one data record associated with at least one user account.

13. The method of claim 1, further comprising:
   providing the plurality of insight records for display; and
   receiving at least one curation input in response to the display of the plurality of insight records.

14. The method of claim 13, wherein the at least one curation input includes at least one of an assignment of at least one insight record to a tier, adjustment of measures, strength scores, and strength classifications.

15. A system, comprising:
   a processor;
   a memory disposed in communication with the processor and storing program instructions that, when executed by the processor, cause the processor to:
   identify primal data variables, including at least topic, demographic and brand; determine primal data variable trends over time;
   generate a plurality of insight records based on a relationship within a corpus of documents between the primal data variable trends for at least two primal data variables; filter the insight records according to pre-filtering criteria; sort the insight records according to ranking criteria;
   identify at least one insight natural language presentation template associated in memory with at least one of the plurality of insight records, the at least one natural language presentation template configured to generate a natural language report comprising the relationship between the primal data variable trends for the at least two primal data variables;
   populate the at least one natural language presentation template with the at least two primal data variables and the primal data variable trends to yield a natural language report; and
   provide the natural language report for display.

16. A processor-accessible non-transitory medium storing processor-issuable instructions, comprising:
   identify primal data variables, including at least topic, demographic and brand;
   determine primal data variable trends over time;
   generate a plurality of insight records based on a relationship within a corpus of documents between the primal data variable trends for at least two primal data variables; filter the insight records according to pre-filtering criteria; sort the insight records according to ranking criteria;
   identify at least one insight natural language presentation template associated in memory with at least one of the plurality of insight records, the at least one insight natural language presentation template configured to generate a natural language report comprising the relationship between the primal data variable trends for the at least two primal data variables;
   populate the at least one natural language presentation template with the at least two primal data variables and the primal data variable trends to yield a natural language report; and provide the natural language report for display.

17. The method of claim 10, wherein the ranking criteria includes the insight actionability, and further comprising:
    calculating a primal elasticity associated with at least one of the primal data variables; and
    determining the insight actionability based on the primal elasticity.

18. The method of claim 1, wherein generating a plurality of insight records and sorting the insight records are performed periodically according to at least one user-customized period.

19. The method of claim 1, wherein the natural language report is presented via a web page.

\* \* \* \* \*